United States Patent
Onofrio et al.

(10) Patent No.: US 12,094,485 B1
(45) Date of Patent: *Sep. 17, 2024

(54) LOW POWER GUNSHOT DETECTION IMPLEMENTATION

(71) Applicant: Shooter Detection Systems, LLC, Newburyport, MA (US)

(72) Inventors: Richard Thomas Onofrio, Arlington, MA (US); Ronald A Fowler, Westford, MA (US); Frank Ray Bachmann, Nashua, NH (US)

(73) Assignee: Shooter Detection Systems, LLC, Newburyport, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,205

(22) Filed: May 24, 2023

Related U.S. Application Data

(63) Continuation of application No. 17/504,579, filed on Oct. 19, 2021, now Pat. No. 11,688,414, which is a
(Continued)

(51) Int. Cl.
| | | |
|---|---|---|
| *G10L 25/51* | (2013.01) | |
| *G01P 13/00* | (2006.01) | |
| *G01V 1/00* | (2024.01) | |

(52) U.S. Cl.
CPC .............. *G10L 25/51* (2013.01); *G01P 13/00* (2013.01); *G01V 1/001* (2013.01)

(58) Field of Classification Search
CPC .......... G10L 25/51; G01P 13/00; G01V 1/001
See application file for complete search history.

(56) References Cited

U.S. PATENT DOCUMENTS

| | | |
|---|---|---|
| 5,930,202 A | 7/1999 | Duckworth et al. |
| 6,178,141 B1 | 1/2001 | Duckworth et al. |
| (Continued) | | |

FOREIGN PATENT DOCUMENTS

| | | |
|---|---|---|
| WO | WO0073811 A1 | 12/2000 |
| WO | WO2009046367 A1 | 4/2009 |
| (Continued) | | |

OTHER PUBLICATIONS

González-Castano, Francisco Javier, et al. "Acoustic sensor planning for gunshot location in national parks: a pareto front approach." Sensors 9.12 (2009): 9493-9512.

*Primary Examiner* — Daniel Pihulic
(74) *Attorney, Agent, or Firm* — Adams Intellex, PLC

(57) ABSTRACT

Techniques for low power gunshot detection are disclosed. Infrared information is collected using a gunshot sensor device. The infrared information is collected using mid-infrared band sensing to provide motion detection. Additional infrared information is buffered using the gunshot sensor device. The additional infrared information is collected using near-infrared band sensing. The buffering is enabled by the motion detection. Acoustic information is collected using the gunshot sensor device. The collecting acoustic information is enabled by the motion detection. A gunshot is detected using the gunshot sensor device. The detecting is based on the additional infrared information and the acoustic information. The detecting includes monitoring the acoustic information to identify a high-intensity gunshot sound and correlating the high-intensity gunshot sound to the infrared information that was buffered. The gunshot sensor device uses cable-free communication to a network and notifies the network of a possible gunshot occurrence.

29 Claims, 16 Drawing Sheets

Related U.S. Application Data continuation-in-part of application No. 16/876,218, filed on May 18, 2020, now Pat. No. 11,282,358, which is a continuation-in-part of application No. 15/684,925, filed on Aug. 23, 2017, now Pat. No. 10,657,800, which is a continuation-in-part of application No. 15/613,161, filed on Jun. 3, 2017, now abandoned, which is a continuation-in-part of application No. 15/498,283, filed on Apr. 26, 2017, now Pat. No. 10,586,109.

(60) Provisional application No. 63/104,540, filed on Oct. 23, 2020, provisional application No. 62/429,754, filed on Dec. 3, 2016, provisional application No. 62/379,023, filed on Aug. 24, 2016, provisional application No. 62/345,465, filed on Jun. 3, 2016, provisional application No. 62/327,552, filed on Apr. 26, 2016.

(56) References Cited

U.S. PATENT DOCUMENTS

| | | | |
|---|---|---|---|
| 6,847,587 | B2 | 1/2005 | Patterson et al. |
| 7,203,132 | B2 | 4/2007 | Berger |
| 7,266,045 | B2 | 9/2007 | Baxter et al. |
| 7,411,865 | B2 | 8/2008 | Calhoun |
| 7,474,589 | B2 | 1/2009 | Showen et al. |
| 7,532,542 | B2 | 5/2009 | Baxter et al. |
| 7,586,812 | B2 | 9/2009 | Baxter et al. |
| 7,599,252 | B2 | 10/2009 | Showen et al. |
| 7,602,329 | B2 | 10/2009 | Manderville et al. |
| 7,688,679 | B2 | 3/2010 | Baxter et al. |
| 7,710,278 | B2 | 5/2010 | Holmes et al. |
| 7,719,428 | B2 | 5/2010 | Fisher et al. |
| 7,750,814 | B2 | 7/2010 | Fisher et al. |
| 7,751,282 | B2 | 7/2010 | Holmes et al. |
| 7,755,495 | B2 | 7/2010 | Baxter et al. |
| 7,796,470 | B1 | 9/2010 | Lauder et al. |
| 7,855,935 | B1 | 12/2010 | Lauder et al. |
| 7,961,550 | B2 | 6/2011 | Calhoun |
| 8,036,065 | B2 | 10/2011 | Baxter et al. |
| 8,063,773 | B2 | 11/2011 | Fisher et al. |
| 8,134,889 | B1 | 3/2012 | Showen et al. |
| 8,325,562 | B2 | 12/2012 | Showen |
| 8,325,563 | B2 | 12/2012 | Calhoun et al. |
| 8,351,297 | B2 | 1/2013 | Lauder et al. |
| 8,369,184 | B2 | 2/2013 | Calhoun |
| 8,478,319 | B2 | 7/2013 | Azimi-Sadjadi et al. |
| 8,995,227 | B1 | 3/2015 | Johnson |
| 9,240,114 | B2 | 1/2016 | Showen et al. |
| 11,282,353 | B1 * | 3/2022 | Fowler ............. G08B 13/19613 |
| 11,604,248 | B1 * | 3/2023 | Onofrio .................... G01S 5/18 |
| 11,688,414 | B1 * | 6/2023 | Onofrio ............... G06V 10/764 367/128 |
| 2004/0100868 | A1 | 5/2004 | Patterson, Jr. et al. |
| 2008/0219100 | A1 | 9/2008 | Fisher et al. |
| 2010/0278013 | A1 | 11/2010 | Holmes et al. |
| 2012/0300587 | A1 | 11/2012 | Azimi-Sadjadi et al. |
| 2014/0361886 | A1 | 12/2014 | Cowdry |
| 2015/0070166 | A1 | 3/2015 | Boyden et al. |
| 2015/0071038 | A1 | 3/2015 | Boyden et al. |
| 2015/0177363 | A1 | 6/2015 | Hermann et al. |
| 2015/0268170 | A1 | 9/2015 | Scott et al. |
| 2015/0347902 | A1 | 12/2015 | Butler, Jr. et al. |
| 2016/0086472 | A1 | 3/2016 | Herrera et al. |
| 2016/0133107 | A1 | 5/2016 | Showen et al. |
| 2016/0225242 | A1 | 8/2016 | Kane et al. |
| 2016/0232774 | A1 | 8/2016 | Noland et al. |
| 2016/0260307 | A1 | 9/2016 | Skorpik et al. |
| 2017/0123038 | A1 | 5/2017 | Griggs et al. |
| 2017/0169686 | A1 | 6/2017 | Skorpik et al. |

FOREIGN PATENT DOCUMENTS

| | | |
|---|---|---|
| WO | WO2009048500 A2 | 4/2009 |
| WO | WO2009085361 A2 | 7/2009 |
| WO | WO2010039130 A1 | 4/2010 |
| WO | WO2010085822 A2 | 7/2010 |
| WO | WO2012103153 A2 | 8/2012 |
| WO | WO2014070174 A1 | 5/2014 |
| WO | WO2014165459 A2 | 10/2014 |

* cited by examiner

LOW POWER GUNSHOT DETECTION IMPLEMENTATION

RELATED APPLICATIONS

This application is a continuation of U.S. patent application "Low Power Gunshot Detection" Ser. No. 17/504,579, filed Oct. 19, 2021, which claims the benefit of U.S. provisional patent application "Low Power Gunshot Detection" Ser. No. 63/104,540, filed Oct. 23, 2020.

The application "Low Power Gunshot Detection" Ser. No. 17/504,579 is also a continuation-in-part of U.S. patent application "Gunshot Detection in an Indoor Environment" Ser. No. 16/876,218, filed May 18, 2020.

The application "Gunshot Detection in an Indoor Environment" Ser. No. 16/876,218, filed May 18, 2020, is also a continuation-in-part of U.S. patent application "Gunshot Detection within an Indoor Environment" Ser. No. 15/684,925, filed Aug. 23, 2017, which claims the benefit of U.S. provisional patent applications "Gunshot Detection within an Indoor Environment" Ser. No. 62/379,023, filed Aug. 24, 2016, and "Testing of Gunshot Sensors" Ser. No. 62/429,754, filed Dec. 3, 2016.

The application "Gunshot Detection within an Indoor Environment" Ser. No. 15/684,925, filed Aug. 23, 2017, is also a continuation-in-part of U.S. patent application "Indoor Gunshot Detection Analysis with Ongoing Fire Alarm" Ser. No. 15/613,161, filed Jun. 3, 2017, which claims the benefit of U.S. provisional patent applications "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

The application "Indoor Gunshot Detection Analysis with Ongoing Fire Alarm" Ser. No. 15/613,161, filed Jun. 3, 2017, is also a continuation-in-part of U.S. patent application "Indoor Gunshot Detection with Video Analytics" Ser. No. 15/498,283, filed Apr. 26, 2017, which claims the benefit of U.S. provisional patent applications "Indoor Gunshot Detection with Video Analytics" Ser. No. 62/327,552, filed Apr. 26, 2016, "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

Each of the foregoing applications is hereby incorporated by reference in its entirety.

FIELD OF ART

This application relates generally to gunshot analysis and more particularly to low power gunshot detection.

BACKGROUND

Gun violence has become far too commonplace in recent years. The problem has risen to the point that some people are arguing that such violence has become a public health emergency. According to recent statistics, one in three people in the United States knows a gunshot victim. On average, 31 Americans are murdered with guns every day, and another 151 are treated in an emergency room for a gun assault. In 2015 alone, more than 12,000 people were killed in the United States by a gun, and many others were injured. Gun violence has become prevalent in a wide variety of public places, such as schools, places of worship, sporting arenas, nightclubs, businesses, hospitals, and airports. While the increased use of metal detectors, body scanners, and other security measures such as physical searches are now commonly employed in an attempt to detect, prohibit, and exclude firearms from such venues, incidents of gun violence in public places continue to increase.

The use of electronic devices for gunshot detection, rather than humans, is performed for a variety of purposes and applications in areas that include the military, law enforcement, security, and public safety. Rapid, efficient, and accurate gunshot detection is a highly complex task due to the sheer variety of weapons and explosive devices that can produce the gunshot event. Identifying the point of origin of the gunshot is essential to quickly identifying and tracking a suspected shooter. Yet, the identification of the source of the gunshot is complicated by many factors including the spatial environment in which the gunshot event occurs. Gunshot detection and shooter identification are critical elements in many military, law enforcement, security, and public safety scenarios.

Some early work in detecting gunshots in an outdoor setting involved using several microphones distributed over a large distance. A gunshot is often sufficiently loud that it can be heard many thousands of feet away in an outdoor setting. The occurrence of a gunshot would then register on the microphones, with the gunshot sound arriving at slightly different times. A gunshot could be registered even at the same microphone at slightly different times due to echoes, also referred to as the multipath problem. For example, the speed of sound in dry air at sea level at 680 Fahrenheit is about 1125 feet/second. A gunshot that occurs somewhere between two microphones that are situated 2500 feet apart would be detected at the microphones one or even two seconds apart, which is an easily detectable difference. Furthermore, the relative times of detection are an indication of the proximity of the gunshot to one microphone versus another microphone. Unfortunately, this scheme cannot distinguish between gunshots and other similar explosive sounds, such as car backfires, construction noises, fireworks, thunder, etc.

The problem of detecting an indoor gunshot event is significantly more complicated than detecting an outdoor gunshot event. For indoor settings, many different factors can complicate accurate gunshot detection. For an indoor setting, the probability of extensive sound reverberations and echoes from the initial gunshot is very high. Further, rooms within the indoor setting often introduce convoluted acoustic pathways. These acoustic pathways are commonly blocked by doors that are closed for fire safety. The closed doors cause many decibels of sound attenuation. In addition, indoor settings are often spread over multiple floors and can be replete with crowds of people. Such layouts and crowds make dealing with indoor gunshots extremely challenging for law enforcement officers or other public safety personnel, because pinpointing a gunshot event location or tracking a suspected shooter is difficult. Additionally, many other distracting audible and visible interferences may be present in a crowded, indoor environment, including screams, crying, flashlights, police alarms, building alarms, fire alarms, earthquake alarms, tornado alarms, and the like. Even with these complicating factors, gunshot detection in an indoor environment is an important element of public safety.

SUMMARY

Gun violence remains a significant societal concern, particularly when gunshot events take place in indoor venues such as schools, places of worship, sporting arenas, nightclubs, movie theaters, and airports. Government agencies, law enforcement, emergency response teams, and others seek rapid detection of these events so that they may respond quickly and appropriately to the given situation. However, accurate gunshot detection is complicated. External environmental factors such as sirens and lights from fire alarms, or loud music and flashing lights in nightclubs, pose challenges to indoor gunshot detection. Disclosed embodiments provide techniques that utilize one or more position-independent gunshot sensor devices. Embodiments provide a processor-implemented method for gunshot analysis. The method can include collecting infrared information using a gunshot sensor device. The infrared information is collected using mid-infrared (MIR) band sensing to provide motion detection. The gunshot sensor device can use cable-free communication to a network. The gunshot sensor device is powered by a battery. The method can include buffering additional infrared information using the gunshot sensor device. The additional infrared information is collected using near-infrared (NIR) band sensing, and the buffering is enabled by the motion detection. The near-infrared information can be buffered within the gunshot sensor device. The method can include collecting acoustic information using the gunshot sensor device, where the collecting acoustic information is enabled by the motion detection. The acoustic information can be used to identify a high-intensity gunshot sound, and to correlate, using the gunshot sensor device, the high-intensity gunshot sound to the infrared information that was buffered. The correlating can include establishing a temporal correspondence between the gunshot sound and an infrared event that occurred in time before the gunshot sound. The temporal correspondence can identify the number of milliseconds (time) between the events. The method can include detecting a gunshot using the gunshot sensor device. The detecting can be based on the additional infrared information and the acoustic information. The gunshot sensor device can use cable-free communication to a network. The method includes using the cable-free communication to notify the network of a possible gunshot occurrence, based on the detecting. The notifying can be based on an analysis of the high-intensity gunshot sound and an NIR event that were correlated. Thus, the disclosed embodiments are configured to minimize false positives due to external environmental factors.

A processor-implemented method for gunshot analysis is disclosed comprising: collecting infrared information using a gunshot sensor device, wherein the infrared information is collected using mid-infrared (MIR) band sensing to provide motion detection; buffering additional infrared information using the gunshot sensor device, wherein the additional infrared information is collected using near-infrared (NIR) band sensing, and wherein the buffering is enabled by the motion detection; collecting acoustic information using the gunshot sensor device, wherein the collecting acoustic information is enabled by the motion detection; and detecting a gunshot using the gunshot sensor device, wherein the detecting is based on the additional infrared information and the acoustic information.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
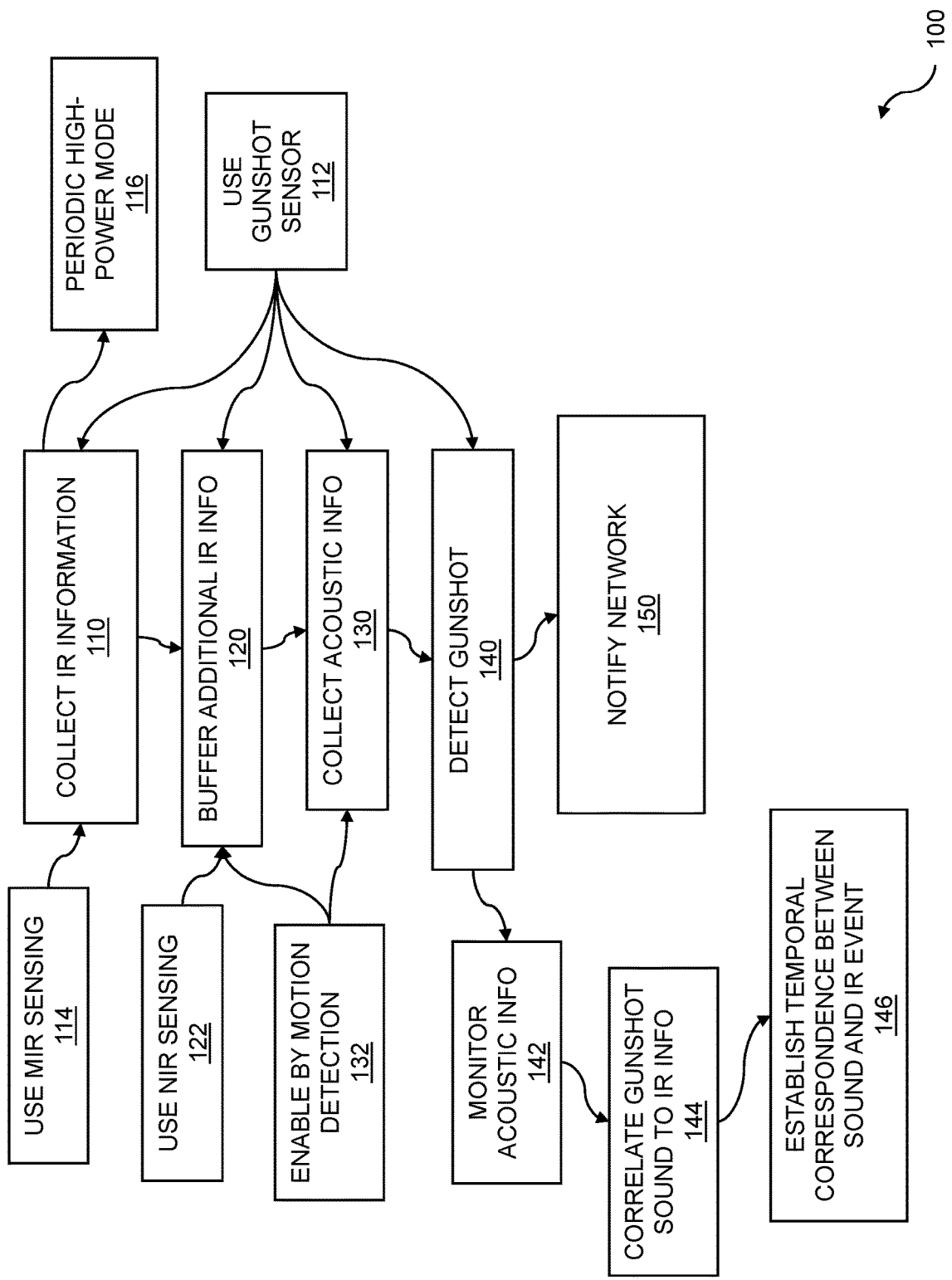
FIG. 1 is a flow diagram for low power gunshot detection.

Techniques for low power gunshot analysis within an indoor environment are described herein. The safety and security of building occupants have become paramount concerns for law enforcement, government officials, emergency responders, business owners, educators, hospital administrators, and many others, as the numbers of active shooter events have increased. The rapid and accurate identification of true gunshots is critical to the protection of the building occupants, as is the elimination of false alerts. The gunshots can be identified by their associated muzzle flashes and loud acoustic signatures, the latter including muzzle blasts and acoustic shock waves. To detect gunshot occurrences, a gunshot sensor device can be situated in an indoor environment. The gunshot sensor device can include multiple individual sensors, including, but not limited to, an acoustic sensor, a mid-infrared (MIR) sensor, and a near-infrared (NIR) sensor. The acoustic sensor can detect the acoustic pressure wave that is typically emitted by a firearm when it is fired. Further, a firearm typically emits energy within the infrared spectrum when fired. Thus, by detecting the infrared emission that is coincidental with a detected acoustic pressure wave, a presumption of a gunshot can be inferred. The acoustic sensor can be configured to detect the initial pressure wave emitted from a firearm. In essence, the acoustic sensor can only detect very loud, sudden bursts of acoustic energy associated with a gunshot, such as shock waves and/or loud blasts. Other high sound pressure level (SPL) sounds, such as loud music, slamming doors, and shouting voices do not generally trigger the acoustic pressure sensor. The mid-infrared sensor and the near-infrared sensor, however, can be deceived by naturally occurring IR sources such as lightning and sunlight reflecting off of surfaces, and by strobe lights often associated with a fire alarm or other alarm. This deceiving of one or more of the IR sensors can trigger infrared sensor activation and can lead to false positive gunshot detections.

The disclosed low power gunshot sensor devices provide numerous advantages. One such advantage is a legal benefit in that the acoustic sensor does not record voices as a traditional microphone would. Excluding voices maintains privacy and confidentiality within the indoor environment, since the acoustic sensor does not pick up conversations, lectures, or other verbal events that might be transpiring within the environment. Another key advantage is that the acoustic sensor is configured to detect the primary acoustic wave from the firearm, but is unlikely to pick up reverberations and echoes from reflected sound waves. Since these secondary acoustic waves that may reverberate off walls and other surfaces, or may travel down multiple hallways in the indoor environment, are mostly ignored by the acoustic sensor, a position-independent gunshot sensor is facilitated. There is no need for special calibrations or other setup of the gunshot sensor in a given indoor environment. The elimination of calibration is particularly advantageous in large indoor environments such as schools, airports, gymnasiums, and sporting arenas. Thus, the analyzing can be accomplished without tuning the gunshot sensor for the indoor environment in which the gunshot sensor resides. (The tuning requirements differ within a room when the room is empty or full.) Furthermore, the analyzing can provide a distance from the shooter to the sensor. In some environments, multiple gunshot sensors can be used. The installation of the gunshot detection system in these indoor environments is straightforward and time-efficient because there is no need to specifically select a particular position within the indoor environment, nor is there a need for any pre-use calibration. These capabilities enable the disclosed systems to be quickly and efficiently installed in indoor environments, providing the desired gunshot detection in transportation venues, entertainment venues, hospitals, schools, and other large, public, indoor environments.

In some configurations, multiple gunshot sensors are used. The multiple sensors are connected to a gateway device that receives feedback from the gunshot sensors and can report the data upstream to a monitoring system, emergency warning system, or another suitable system. In some configurations, the gunshot sensor can further include a video camera and a microphone. The microphone can be connected to a pickup circuit with its gain set such that the microphone only picks up very loud noises (e.g., 110-130 decibels or greater), such as a muzzle blast, and does not pick up ordinary conversation. In some embodiments, a lower decibel threshold is set to enable detection of acoustically suppressed or lower caliber weapons. In some embodiments, a video management system is integrated and enabled to provide various notification services to law enforcement, emergency services, the military, or other organizations. In some embodiments, the video camera and microphone are only activated after a gunshot detector detects a possible gunshot. Thus, if a gunshot is detected in the indoor environment, the microphone and video camera can be activated in an attempt to record audio and video of the scene and possibly to record audio and video of the suspect(s) who fired the gunshot. In such embodiments, the gunshot sensor enters a surveillance mode once a gunshot has been detected, and the gain of the microphone circuit can be adjusted to pick up additional sounds such as speech. The recorded audio and video information can be of tactical importance to law enforcement so that they can better understand the extent of injuries and casualties, and also assess the number of shooters on the scene.

Another challenge of gunshot detection in an indoor environment is the various external environmental factors that can occur in temporal proximity to a gunshot. For example, a fire alarm can create both a very loud noise and a flashing strobe. In a nightclub, music can be very loud, and there might be a multitude of strobes and other flashing lights. Disclosed systems can accommodate such environmental factors and still provide effective gunshot detection with one or more position-independent gunshot sensors placed within an indoor environment, thus enabling effective and efficient gunshot monitoring, and improving public safety.

A typical firearm discharge involves various phenomena. There is a muzzle flash, which emits visible and infrared light. A muzzle flash typically comprises multiple phases, which include a primary flash, an intermediate flash, and a secondary flash. The primary flash results as hot, highly compressed gases, which are the unburned propellants, exit the barrel along with the projectile. These gases expand rapidly, not mixing with the atmosphere, then rebound. This creates a high-temperature region that produces the intermediate flash. As oxygen mixes with the unburned propellants, ignition occurs, causing the secondary flash. A majority of the radiated energy corresponding to the muzzle flash occurs during the secondary flash, and most of the total radiated energy is in the infrared (IR) region. This is in contrast to other environmental factors within an indoor environment, such as fire alarm strobes. The light emitted by a fire alarm strobe is mostly in the visible spectrum, with a much lower IR component. Thus, detecting IR energy is an important aspect of gunshot detection.

A shock wave following a gunshot event, which is caused by the supersonic travel of the projectile/bullet, can also occur. A supersonic bullet causes a distinctive shock wave pattern as it moves through the air. The shock wave expands as a cone behind the bullet, with the wave front propagating outward at the speed of sound. As the shock wave propagates, the nonlinear behavior of the air causes the pressure disturbance to form an "N" shape with a rapid onset, a ramp to the minimum pressure, and then an abrupt offset. Most common events within an indoor environment do not cause a shock wave. For example, a door slamming, while perceived as loud to someone within its hearing, does not cause a shock wave such as that which would result from supersonic travel of a projectile. Thus, detection of a shock wave can be an important factor in gunshot detection. However, shock waves are largely dependent on the orientation of projectile motion. Hence, the direction of the gunshot in relation to the gunshot detector can affect the magnitude of the detected shock wave. Furthermore, there can be a muzzle blast, which is the sound caused by the discharge of the firearm. A typical firearm uses a confined explosive charge to push the bullet down and out of the gun barrel. The hot, rapidly expanding gases cause a muzzle blast to emerge from the barrel. The acoustic disturbance can have a duration in the range of 3 to 5 milliseconds and can propagate through the air at the speed of sound.

To illustrate, a low power gunshot detection sensor can be in a low power, motion detection mode. While no motion is detected, based on input from a mid-infrared band sensor, any buffering of acoustic and IR gunshot data can be halted, thus saving power because there is no active buffering occurring. Once motion is detected, the sensor can begin to collect acoustic and IR data. The IR data can be collected using the near-infrared sensor in a low power buffer mode, which is described in more detail below. Data can be held in circular buffer. A DMA engine within a low power gunshot detection sensor processor can manage the collection while the processor itself is in a sleep mode (e.g., the processor is not clocked; only needed peripherals and the DMA engine are clocked). A loud acoustic event that surpasses a minimum threshold can then occur. This can cause the sensor to move to a higher power mode. Additional data can then be collected and joined with buffered data from the low power mode.

The data can then be analyzed for a potential gunshot event. As will be described presently, the buffering facilitates pre-event, event, and post-event data to be collected. If a gunshot is detected, an alert can be sent. If the event is determined not to be a gunshot, the sensor can return to a low power collection mode. If motion is not subsequently detected for a predetermined amount of time (e.g., 10 minutes), regardless of whether a loud acoustic event occurred, the low power buffering data collection mode can be exited, and the sensor can remain in the ultra-low power motion detection mode. Another motion detection event can cause the sensor to repeat the above-described steps. Additionally, a motion detection alerting function can be enabled such that the sensor can transmit a "motion detected" alert to a receiving server or gateway. This alerting function can operate independently from the gunshot detection functionality.

FIG. 1 is a flow diagram for low power gunshot detection. The flow 100 includes collecting infrared information 110 using a gunshot sensor device 112. The gunshot sensor device can be located within an indoor environment, where the indoor space can include an office space, a hospital, a school, etc.; where the indoor space can include a plurality of rooms, hallways; and so on. The indoor space can include large or open indoor spaces such as shopping malls, movie theaters, conference halls, auditoria, atria, open floorplan buildings, "cube farms", and the like. In embodiments, the collecting infrared information can include an ultra-low-power mode of the gunshot sensor device. The collecting of infrared information can be accomplished by providing power to one or more infrared sensors while powering down or putting into standby mode other components associated with the gunshot sensor device. The gunshot sensor device can be contained within a housing. In embodiments, the housing is mountable on a building wall or ceiling, on a partition or divider, on a post, on an item of furniture, on a barricade, etc. In the flow 100, infrared information is collected using mid-infrared (MIR) band sensing 114. The mid-infrared band can include infrared wavelengths between 3 μm and 50 μm. The mid-infrared band sensing is used to provide motion detection. The motion detection can include detecting movement of one or more individuals within the indoor space. Recall that the gunshot sensor device can include a low power gunshot sensor device. The flow 100 further includes periodic excursions 116 to a higher-power mode by the gunshot sensor device. The higher-power mode can be activated when a potential gunshot event is detected by the gunshot sensor device. The higher-power mode can enable the infrared information collection, processing and analysis of the infrared information, and the like. Discussed below, the higher-power mode can enable cable-free communication of gunshot sensor health data by the low power gunshot sensor device over a network. The network can be used to enable communication between the gunshot sensor device and a gunshot detection gateway. The gunshot sensor gateway can enable communication between the gunshot sensor device and law enforcement, emergency services, etc.

The flow 100 includes buffering additional infrared information 120 using the gunshot sensor device. The additional infrared information can include additional mid-infrared information or infrared information of another infrared band. In the flow 100, the additional infrared information is collected using near-infrared (NIR) band 122 sensing. The near-infrared band can include infrared wavelengths between 0.78 μm and 3 μm. The collection of the additional infrared information can be based on detecting a possible gunshot event. In embodiments, the buffering can be enabled by the motion detection. The collection can also be based on use of a "sliding window" technique in which an amount of infrared information can be collected periodically. In embodiments, the buffering of the additional infrared information can be performed by a low-power infrared information buffer and a high-power infrared information buffer. The low-power information buffer can include a slow, power efficient buffer that can store near-infrared information. Discussed below, in embodiments, the low-power infrared information buffer can enable gunshot event confirmation. The high-power infrared information buffer can include a small fast buffer that can be used for processing, analyzing, and so on, the buffered near-infrared information. In embodiments, the high-power infrared information buffer can include spurious infrared information filtering. Spurious infrared information can include non-gunshot event-associated infrared information that can originate from natural sources, manmade sources, and the like. In embodiments, the spurious infrared information filtering can include fire alarm filtering. A fire alarm frequently includes a klaxon or horn and a visible strobe. The light from the strobe can "leak" or "bleed" into the infrared band, thus potentially causing false positives for firearm muzzle flashes. In other embodiments, the spurious infrared information filtering can include high-level ambient lighting filtering. The high-level ambient lighting can include lightning; a flash of sunlight off a mirror, window, or vehicle window; etc.

The flow 100 includes collecting acoustic information 130 using the gunshot sensor device. The acoustic information that is collected can include high sound pressure level (SPL) sounds such as a high-intensity gunshot sound; low SPL sounds such as conversations, shouts, screams, crying, or other sounds including human-generated sounds; and so on. The acoustic information can selectively include high SPL or low SPL sounds. In the flow 100, the collecting acoustic information 130 and the buffering additional IR information 120 can be enabled by the motion detection 132. The motion detection can start collection of IR/acoustic information, adjust gain of a component used for collecting IR/acoustic information, initiate collection buffering of IR/acoustic information, change collection power modes for IR/acoustic information, etc. The motion detection can initiate an alert to a downstream network that motion has been detected. The acoustic information can include detection of a shock wave and/or a sound wave. The shock wave and/or the sound wave are detected with an acoustic sensor. The shock wave emanates from the projectile as it travels through the air at supersonic speeds. The acoustic information can include the sound wave from the firearm itself. The sound wave may be detected by a microphone that is coupled to a pickup circuit. The gain of the pickup circuit can be configured to detect only very loud sounds (e.g., 110-130 decibels or greater). In embodiments, the acoustic information includes only the sound wave from the firearm itself. In this case, the shock wave could have been attenuated, missing, or otherwise misdirected such that it is not included and not necessary or required to detect and confirm the gunshot. Shock waves are typically formed due to events such as supersonic travel of a projectile, or a nearby lightning strike. The sound wave is a loud sound emitted from the firearm upon discharge. Other factors in an indoor environment, such as fire alarms, doors slamming, books dropping, and the like can also cause loud sounds.

Embodiments include buffering the acoustic information. The acoustic information can be buffered for storage, retiming, analysis, signature matching, filtering, and so on. In embodiments, the acoustic information that is buffered can use a low-power buffer and a high-power buffer. The low-power buffer can be used to conserve energy from a source such as a battery. The high-power buffer can be used when fast access to data such as acoustic information is required. In some embodiments, the low-power buffer and the high-power buffer are the same buffer operating in two or more different power modes. In general, the high-power buffer or buffer mode will contain more data (longer sampling time), retain it for a longer period of time, and provide faster data access than the low-power buffer or buffer mode. In embodiments, the low-power buffer can be a pre-trigger event buffer and the high-power mode can be a post-trigger event buffer, where the trigger is the point at which a suspected gunshot is detected. For example, the low-power buffer can be integrated inside a processing device and the high-power buffer can be a standalone buffering device.

The flow 100 includes detecting a gunshot 140 using the gunshot sensor device. The detecting can be based on the infrared information, the acoustic information, or both. In embodiments, the detecting is based on the additional infrared information and the acoustic information. In other embodiments, the low-power acoustic information buffer can enable gunshot event detection. Acoustic information that can be collected using the gunshot sensor device can be stored in the low-power buffer from which it can be analyzed to detect a gunshot event. A gunshot event can include a high SPL signal such as a high-intensity gunshot sound. In other embodiments, the high-power acoustic information buffer can enable spurious information filtering. Filtering of spurious information can include filtering out of periodic acoustic sources such as a klaxon from a fire alarm; alerts from other alarms such as a siren, a bell, or a buzzer; and so on. The flow 100 includes monitoring the acoustic information, using the gunshot sensor device, to identify a high-intensity gunshot sound 142. The monitoring can include scanning the acoustic data that is collected for acoustic information with one or more characteristics. The characteristics can include a high amplitude, or SPL; a duration; a signature; an envelope; and so on. The monitoring can be performed by the gunshot sensor device based on a schedule such as a monitoring mode for operating hours of a school, and a different monitoring mode for after-hours. The monitoring can include monitoring for an anomaly in the acoustic information such as a signal with a magnitude or SPL in excess of a nominal level, an average level, a running average level, and so on. In embodiments, the collecting and the monitoring can include a low-power mode of the gunshot sensor device. The monitoring can be performed continuously; in order to conserve battery power of the battery powering the gunshot sensor device, the gunshot sensor device can be operated in a low power mode.

The flow 100 includes correlating, using the gunshot sensor device, the high-intensity gunshot sound to the infrared information 144 that was buffered. A gunshot occurrence can include acoustic components such as a muzzle blast, a shock wave, and the like. The gunshot occurrence can also include infrared components such as a muzzle flash. A gunshot sensor device may collect acoustic information, infrared information, or both. In the flow 100 correlating includes establishing a temporal correspondence 146 between the gunshot sound and an infrared event that occurred in time before the gunshot sound. Since light travels faster in air and other media than does sound, the muzzle flash information can be detected sooner than can the muzzle blast, shock wave, etc. Establishing the temporal correspondence between the IR components and the acoustic components can be based on an amount of time between the collecting of the IR information and the collecting of the acoustic information. The amount of time can include a window, a tolerance, a margin, a threshold, and the like. In embodiments, the correlating can include a medium-power mode of the gunshot sensor device.

In embodiments, the gunshot sensor device can use cable-free communication to a network. The cable-free communication to a network can include a wireless communication technique such as Wi-Fi, Bluetooth™, Zigbee™, Low Power Wide Area Network (LPWAN), and so on, for short-range or medium-range exchange of information, control of information, etc. The network can include a computer network such as the Internet, a wide area network (WAN), a local area network (LAN), a purpose-built network, and the like. The flow 100 includes notifying the network 150 of a possible gunshot occurrence, based on the detecting. The notifying can be accomplished using direct communication between a gunshot detection device and a gateway, a server, etc. The notifying can be based on messages, codes, data exchanges, and the like. The network can include a computer network such as the Internet, a local area network (LAN), a wide area network (WAN), an ad hoc network, a self-configuring network, a mesh network, and so on. In embodiments, the cable-free communication to a network can include one or more powered communication relay devices. The powered communication relay devices, or "repeaters", can receive information using cable-free communication and can forward the information using wireless or wired techniques. The repeaters can be powered by utility power, backup power, a battery, etc. In other embodiments, the cable-free communication to a network can provide data to a gunshot detection gateway. The notifying can include sending data as a stream or as packets, sending an email, sending a short message service (SMS) text, and the like.

In embodiments, the notifying can be based on an analysis of a high-intensity gunshot sound and an NIR event that were detected. The notifying can be based on an analysis of the high-intensity gunshot sound and the infrared event that was correlated. As discussed throughout, a high-intensity gunshot sound is correlated to an infrared event that occurred in time before the gunshot sound. The analysis can also include matching the gunshot sound to a gunshot signature of a particular weapon. The analysis can be used to filter out periodic IR pulses that can result from a flashing fire alarm, a security breach alert, a lockdown siren, etc. The analysis can also be used for filtering out the IR noise of higher power bulbs, halogen lightbulbs, fluorescent lightbulbs, and so on. The IR noise that is filtered out can be related to powerline frequencies, such 50 Hz or 60 Hz, or to a multiple of powerline frequencies, such as 120 Hz, or to some other periodic IR stimulation frequency. The analysis can enable spurious acoustic information filtering such as reducing echo, filtering out false positive sounds, etc. The analysis can be performed by the gunshot sensor device. In embodiments, additional analysis can be performed by the gunshot sensor device after the analysis of the high-intensity sound and the high-intensity infrared event that was correlated. The additional analysis can include collecting additional acoustic information and IR information from one or more other gunshot sensor devices. The additional analysis can include collecting other data types. In further embodiments, the network can be notified based on the additional analysis. In embodiments, the possible gunshot occurrence activates a video monitoring device. A video camera or sensor can be activated to capture video data near the location of the possible gunshot occurrence, at one or more other locations within the indoor environment, etc. In other embodiments, the video monitoring device is part of a video monitoring system.

The gunshot sensor device can include a housing that can be mounted to a wall, a ceiling, a partition, a post, a divider, and so on, within an indoor environment. An infrared sensor such as a mid-infrared (MIR) band sensor can be located in a housing. The near-infrared sensor located in the housing can provide motion detection. A near-infrared (NIR) band sensor can be co-located in the housing. The near-infrared band sensor can be used to initiate buffering of NIR information. The buffering can be initiated by and/or based on the mid-infrared band sensor detecting motion. An acoustic sensor can be co-located in the housing. The acoustic sensor can be used to detect acoustic signals comprising various sound pressure levels. The acoustic sensor can collect high-intensity sounds, which enables acoustic monitoring. Discussed throughout, a battery can be connected to provide power to the sensors. The battery can be contained within, on, or next to housing. The battery can be rechargeable, single use, etc. A rechargeable battery can be recharged using a solar cell, a trickle charger, and the like. In embodiments, the battery of the gunshot sensor device occupies less than 200 cubic centimeters of volume. The battery can be located outside of the gunshot sensor device housing, adjacent to the housing, etc. In embodiments, the gunshot sensor device and the battery can be co-located in one housing. The gunshot sensor device further includes a processor contained in the housing, where the processor is coupled to the acoustic sensor, the MIR band sensor, and the NIR band sensor, and wherein the processor is connected to the battery. The processor can process and analyze mid-infrared data, near-infrared data, acoustic data, and so on. The processor can control the power consumption of the gunshot detection device, enable communication by the device, etc. A cable-free communication device can be contained within the housing. The cable-free communication device can enable cable-free communication to a computer network, a cellular network, and so on. The cable-free communication device can be coupled to the processor and is connected to the battery to provide gunshot analysis to a network.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
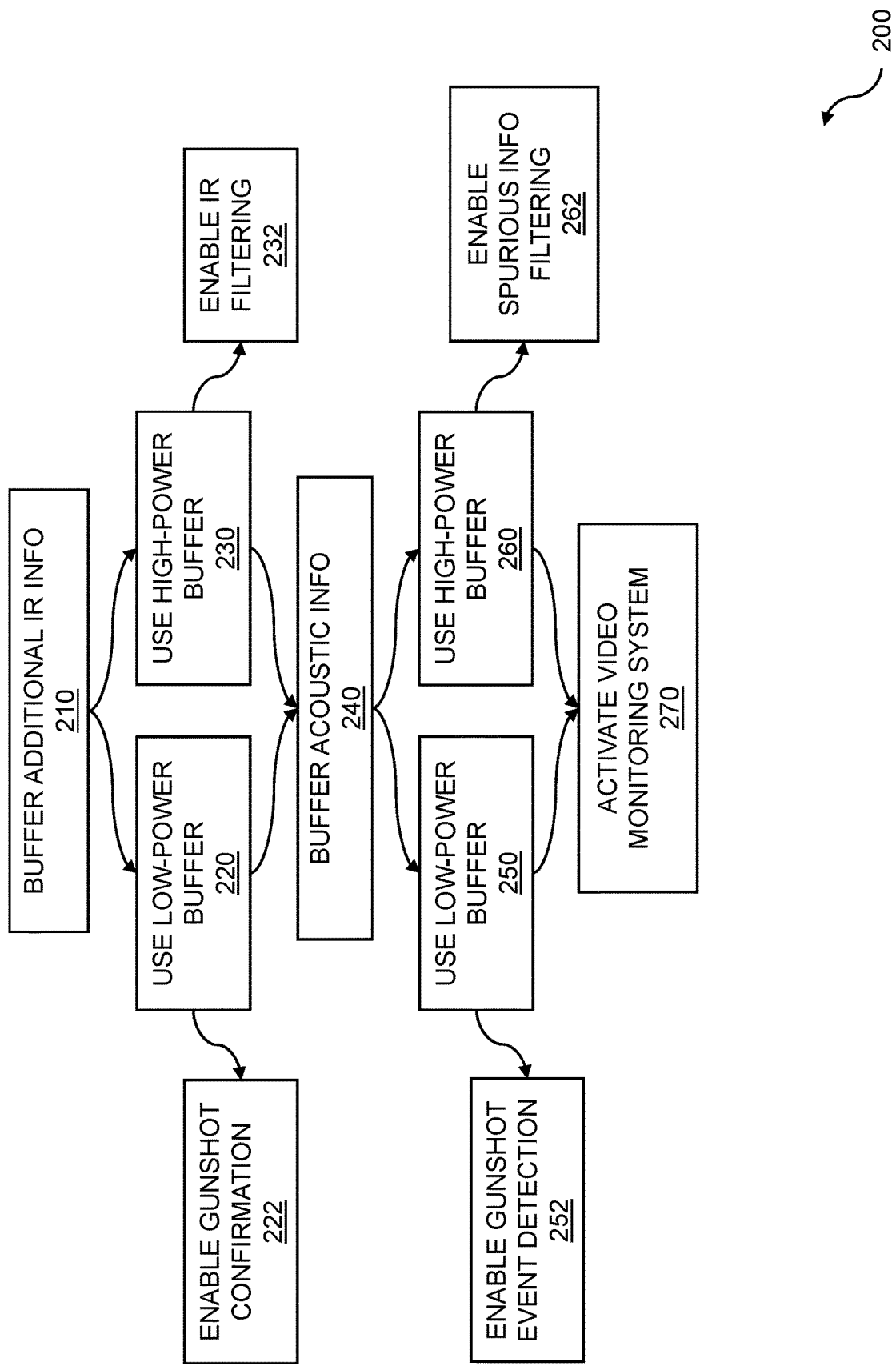
FIG. 2 is a flow diagram for buffer usage.

FIG. 2 is a flow diagram for buffer usage. Discussed throughout, acoustic information, mid-infrared information, and near-infrared information are collected and analyzed within an environment such as an indoor environment using a gunshot sensor device. The acoustic information is monitored for a gunshot sound, where the sound is correlated to a corresponding infrared event that occurred in time before the gunshot sound. The mid-infrared band is sensed to provide motion detection. The detection can be used to detect motion of a person within the indoor environment covered by the gunshot sensor device. The near-infrared band is sensed and the near-infrared data is buffered. The near-infrared sensing and buffering are enabled by the motion detection. A gunshot can be detected based on the buffered near-infrared information and the acoustic information. The collecting, buffering, and detecting enable low power gunshot detection. The gunshot sensor device can use cable-free communication to a network. The network can be used to interconnect a plurality of gunshot sensor devices, to connect one or more gunshot sensor devices to a server, and so on. The network is notified of a possible gunshot occurrence by the gunshot sensor device using the cable-free communication. The gunshot sensor device is used for cable-free indoor gunshot detection. The gunshot sensor device can take periodic excursions to a higher-power mode. The higher-power mode enables cable-free communication to a network of gunshot detector health data to a gunshot detection gateway. The gunshot detection gateway can capture cable-free communication information from one or more gunshot sensor devices, can aggregate notifications of possible gunshot occurrences, can process information, can send back commands or control information, and so on. The gunshot detection gateway can include one or more processors, a server, a blade server, a cloud server, a mesh server, and the like.

The flow 200 includes buffering additional infrared information 210 using the gunshot sensor device. The buffering can include buffering data for a period of time, where the period of time can be associated with a suspected gunshot event; periodically buffering for an amount of data; and so on. The buffering can be based on a sliding window technique. The additional infrared information can be collected using near-infrared (NIR) band sensing. The near-infrared band that is sensed can be based on infrared wavelengths of 0.75 μm to 3 μm. The buffering can be enabled by the motion detection. If motion is detected, then the near-infrared information can be collected and buffered. When a sliding window technique is used, then the buffering can include near-information information collected before the motion was detected.

In the flow 200, the additional infrared information that is buffered uses a low-power 220 information buffer. The low-power information buffer can include a relatively small, slow, and power efficient buffer that can store infrared data based on an amount of time such as a sliding window of time. In the flow 200, the low-power infrared information buffer can enable gunshot event confirmation 222. The gunshot event confirmation can be based on a high intensity infrared pulse. The gunshot event confirmation can be based on comparing the contents of the low-power buffer to known infrared signatures associated with gunshot events. In the flow 200, the additional infrared information that is buffered uses a high-power 230 information buffer. The high-power information buffer can include a larger, faster, less power-efficient buffer for storing the infrared data. The high-speed buffer can be used for infrared data processing and analysis. In the flow 200, the high-power infrared information buffer can enable spurious infrared information filtering 232. Recall that light sources within an indoor environment or that reach or reflect into the indoor environment can include infrared light. These light sources can include daylight, high intensity lamps, strobes, and so on. In embodiments, the strobes can include strobes associated with fire alarms or other alarms. These infrared sources could be confused with important infrared sources such as gunshot events. In embodiments, the spurious infrared information filtering can include fire alarm filtering. The filtering of the fire alarm can be based on a strobe flash frequency, duration, and so on. In other embodiments, the spurious infrared information filtering can include high-level ambient lighting filtering. The ambient lighting can include flashes of light reflected from windows associated with passing vehicles, reflections reaching into the indoor space, and the like.

The flow 200 further includes buffering the acoustic information 240. The buffering the acoustic information can be based on a detecting of a high-intensity infrared pulse, on a sliding window technique, and so on. The acoustic information that is buffered can be collected using a microphone, a transducer, or another audio collection component. In a usage example, gain associated with a microphone can be set to capture only high-intensity or high sound pressure level (SPL) audio signals. The gain of the microphone, transducer, etc., can be increased to capture other acoustic information such as human-generated sounds including speech. In the flow 200, the acoustic information that is buffered uses a low-power acoustic information buffer 250. The low-power buffer can be triggered and used to obtain an amount of acoustic information associated with an infrared event such as a muzzle flash. In the flow 200, the low-power acoustic information buffer can enable gunshot event detection 252. The gunshot event detection can be based on a high sound pressure acoustic signal with a sound pressure level between 120 dB and 160 dB. The gunshot event detection can be based on an infrared event that occurred in time before the gunshot sound. In the flow 200, the acoustic information that is buffered uses a high-power acoustic information buffer 260. The high-power acoustic information buffer can be used for processing and analyzing the acoustic information. In the flow 200, the high-power acoustic information buffer can enable spurious information filtering 262. Spurious acoustic information can include a fire alarm klaxon or horn, thunder, a vehicle horn, loud human-generated sounds, and the like.

In the flow 200, the detecting a gunshot activates a video monitoring system 270. A video monitoring system can include devices such as a video camera, a web camera, a light field camera, a thermal or IR camera, and the like. The video monitoring device can be located within the indoor space, can have a line of sight to the indoor space, and so on. The video monitoring device can enable the providing of a video feed such as a live video feed to law enforcement, emergency response teams, the military, and other forces or services that may be required to respond to a gunshot event. The video monitoring system can find a person within the field of view of the video monitoring system. The person who is found within the view can be marked with a code, an identifier, etc. The person may be a person of interest, a victim, a civilian, a non-threatening person, and the like. The person can include a potential shooter, an active shooter, an innocent bystander, etc. The person can be tracked, where tracking the person can include monitoring movements of the person as they progress through the indoor space. That tracking can include determining that the person is not moving. Reasons for not moving can include sheltering in place, being injured, hiding, etc. Activation of the video monitoring device can include notifying a network of a possible gunshot occurrence. The network can be used to access further gunshot detection devices, a server, a gateway, and so on. The network can be used to provide information, such as the video information, to law enforcement, emergency services, etc. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
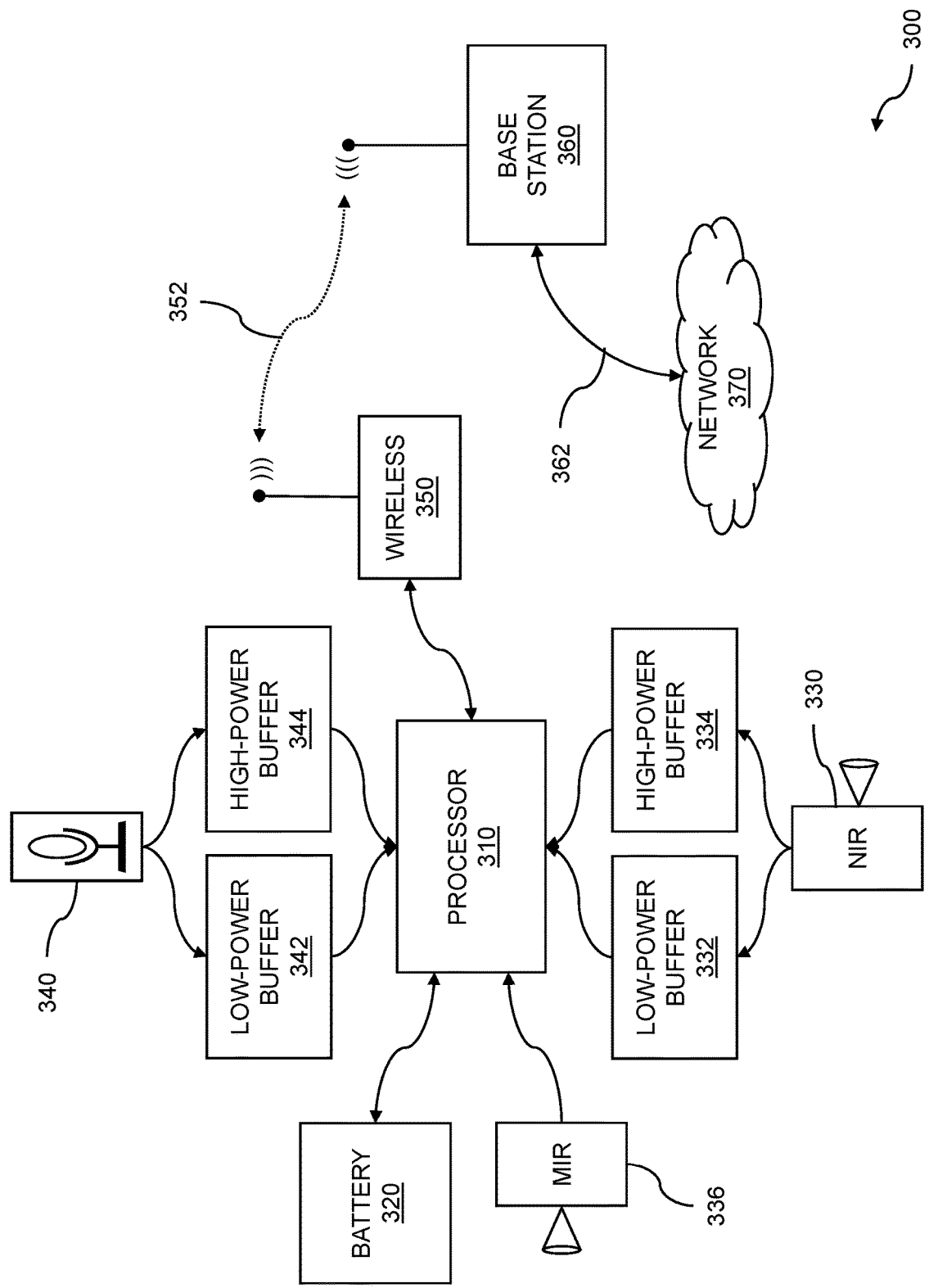
FIG. 3 is a system diagram for cable-free communication with a base station.

FIG. 3 is a system diagram for cable-free communication with a base station. Cable-free communication with a network, a base station, and other components enables cable-free indoor gunshot detection. The gunshot detection includes low power gunshot detection. Infrared information is collected using a gunshot sensor device, where the infrared information is collected using mid-infrared (MIR) band sensing to provide motion detection. Additional infrared information is buffered using the gunshot sensor device. The additional infrared information is collected using near-infrared (NIR) band sensing. The buffering uses a low-power buffer and a high-power buffer. Acoustic information is collected using the gunshot sensor device. The collecting acoustic information is enabled by the motion detection. A gunshot is detected using the gunshot sensor device. The detecting is based on the additional infrared information and the acoustic information. The detecting further includes monitoring the acoustic information to identify a high-intensity gunshot sound. The detecting includes identifying a high-intensity gunshot sound within the acoustic information.

The system 300 can include a processor 310. As discussed throughout, the processor can perform a variety of tasks related to gunshot detection. The tasks performed by the processor can include controlling the operation of various components of the indoor gunshot detection system. The tasks can further include testing tasks, self-diagnostic tasks, etc. The control of operation can include executing codes, apps, algorithms, heuristics, procedures, subroutines, tasks, etc., related to gunshot detection. The processor can include a standalone processor such as an integrated circuit or chip that comprises the processor, a processor within an integrated circuit, a processor core within a programmable chip such as a field programmable gate array (FPGA), a processor core within an application specific integrated circuit (ASIC), and the like. The processor can perform a variety of tasks related to gunshot detection such as collecting infrared (IR) information or acoustic information, buffering the IR or acoustic information, processing the IR or acoustic information, and so on. The processor can enable monitoring for possible gunshot occurrences. The monitoring can be based on detecting IR data that includes one or more wavelengths, detecting acoustic data with a range of high sound pressure levels, etc. The monitoring can include monitoring infrared data or acoustic data for muzzle flashes, high-intensity gunshot sounds, other gunshot related events, or other events such as explosions. The processor can perform further operations relevant to gunshot detection. These other processor operations can include correlating a high-intensity gunshot sound to buffered infrared information, determining a type of firearm, tracking a suspect, notifying a network of a possible gunshot occurrence, etc. The system 300 can include a battery 320. The battery can include a rechargeable battery, a non-rechargeable battery, a single-use battery, and so on. A rechargeable battery may be recharged using a solar cell, a trickle charger, or the like. In embodiments, the battery can occupy less than 200 cubic centimeters of volume. The battery can include a nickel-cadmium battery, a sealed lead acid battery, a lithium iron phosphate battery, etc.

The system 300 can include a near-infrared sensor 330. The near-infrared (NIR) sensor can collect near-infrared information within an environment such as an indoor environment. The near-infrared sensor can detect near-infrared band light with wavelengths between 0.78 μm and 3 μm. The system can include two or more near-infrared sensors, where the two or more near-infrared sensors can be oriented to cover different fields of view, overlapping fields of view, redundant fields of view, and so on. The near-infrared sensor can sense possible gunshot occurrences such as muzzle flashes. The near-infrared information is buffered within the gunshot sensor device. In embodiments, the near-infrared information that is buffered can use a low-power infrared information buffer 332 and a high-power infrared information buffer 334. The low-power infrared information buffer and the high-power infrared information buffer can be coupled to the processor 310 within the gunshot detection system. In embodiments, the low-power infrared information buffer can enable gunshot event confirmation. The gunshot event confirmation can include correlating a high-intensity gunshot sound (discussed shortly) to the near-infrared information that was buffered. The confirmation can be based on correlating, where the correlating can include establishing a temporal correspondence between the gunshot sound and an infrared event that occurred in time before the gunshot sound. In other embodiments, the high-power infrared information buffer can enable spurious infrared information filtering. Spurious infrared information can result from natural phenomena such as a lightning flash; sunlight flashing off a shiny surface such as a wave, a windscreen, or a window; and so on. In embodiments, the spurious infrared information filtering can include fire alarm filtering. The need for fire alarm filtering can result from a strobing light alert, where the spectra of the strobe can bleed over into the infrared range. In other embodiments, the spurious infrared information filtering includes high-level ambient lighting filtering. The need for high-level ambient lighting filtering can result from sunlight or another bright light source shining onto the near-infrared sensor 330. In addition to the one or more near-infrared sensors, the system 300 can include a mid-infrared (MIR) sensor 336. The mid-infrared sensor can detect mid-infrared band light with wavelengths between 3 µm and 50 µm. The mid-infrared information collected by the mid-infrared light sensor can be used to provide motion detection. The motion detection can be used to detect motion of a person within the indoor environment monitored by the gunshot sensor device.

The system 300 can include an acoustic sensor 340. The acoustic sensor can include a microphone, an audio transducer, or another component appropriate for providing acoustic information to a digital system such as a low power gunshot detection system. The acoustic sensor can include a low gain level for collecting only high sound pressure level (SPL) signals; a high gain level for collecting low SPL signals such as conversation, shouting, screaming, crying, whispering, or other human-generated sounds; and so on. The system 300 can include two or more acoustic sensors, where the acoustic sensors can cover different spaces such as indoor spaces, overlapping spaces, redundant spaces, and the like. The acoustic sensor can sense possible gunshot occurrences such as high-intensity gunshot sounds. The high-intensity sounds can include sound pressure levels ranging from 120 dB to 160 dB. Embodiments further include buffering the acoustic information. The acoustic information can be buffered, where the buffering can be accomplished using more than one buffer. In embodiments, the acoustic information that is buffered can use a low-power buffer 342 and a high-power buffer 344. The buffers including the low-power acoustic information buffer 342 and the high-power acoustic information buffer 344 can be coupled to the processor 310 within the gunshot detection system. The processor can be used to accomplish a variety of audio processing techniques such as detecting, correlating, filtering, establishing, matching, and so on. In embodiments, the low-power acoustic information buffer can enable gunshot event detection. The information within the low-power acoustic information buffer can be monitored for a high-intensity gunshot sound. The monitoring can be based on detecting a high-intensity sound, examining the waveform or signature of the high-intensity sound, etc. In other embodiments, the high-power acoustic information buffer can enable spurious information filtering. Spurious information can result from banging equipment such as heavy machinery, loud sounds from extending or retracting bleachers, cheering crowds, crowds clapping or stomping feet in unison, vehicle horns, vehicle backfires, and so on.

The system 300 can include a wireless interface 350. The wireless interface can enable cable-free communication to one or more additional gunshot detection systems, to communication equipment, to a network such as a computer network or a cellular telephony network, and so on. The wireless interface can communicate using one or more wireless communication techniques including Wi-Fi, Bluetooth, Zigbee, near-field communication (NFC), and so on. The wireless interface may use a low power communication technique to reduce power consumption, to evade detection, to avoid interference with other wireless systems and services, etc. In embodiments, the cable-free communication 352 to a network can include one or more power communication relay devices. A power communication relay device can detect a signal and retransmit the signal. The communication relay devices, or "repeaters", can repeat a signal from the wireless interface to extend range, to transfer a signal from one wireless interface to another wireless interface, to convert the wireless signal to a wired signal, and the like. The system 300 can include a base station 360. The base station can be in communication 362 with a network 370, such as the Internet or other computer network, a cellular network, etc. In embodiments, the cable-free communication to a network can provide data to a gunshot detection gateway. The gunshot detection gateway can aggregate data from one or more gunshot detection systems. Embodiments include periodic excursions to a higher-power mode by the gunshot sensor device. Using periodic excursions to higher-power can conserve battery life. The higher-power mode enables cable-free communication from a network of gunshot sensor health data to a gunshot detection gateway. The gunshot sensor health data can be associated with the operation of a gunshot sensor system, the accuracy or efficacy of the system, and the like. In embodiments, the health data can include one or more of gunshot sensor device identification (ID), battery levels, battery drain rate, self-diagnostic data, local communication data, or additional event data. The gunshot detection gateway can collect possible gunshot occurrence information, can aggregate possible gunshot occurrence information, and so on. The gunshot detection gateway can access network-based resources such as servers or databases to analyze possible gunshot occurrences. In embodiments, the gunshot detection gateway corroborates an actual gunshot occurrence based on data communicated from one or more additional gunshot sensor devices.

Figure 4:
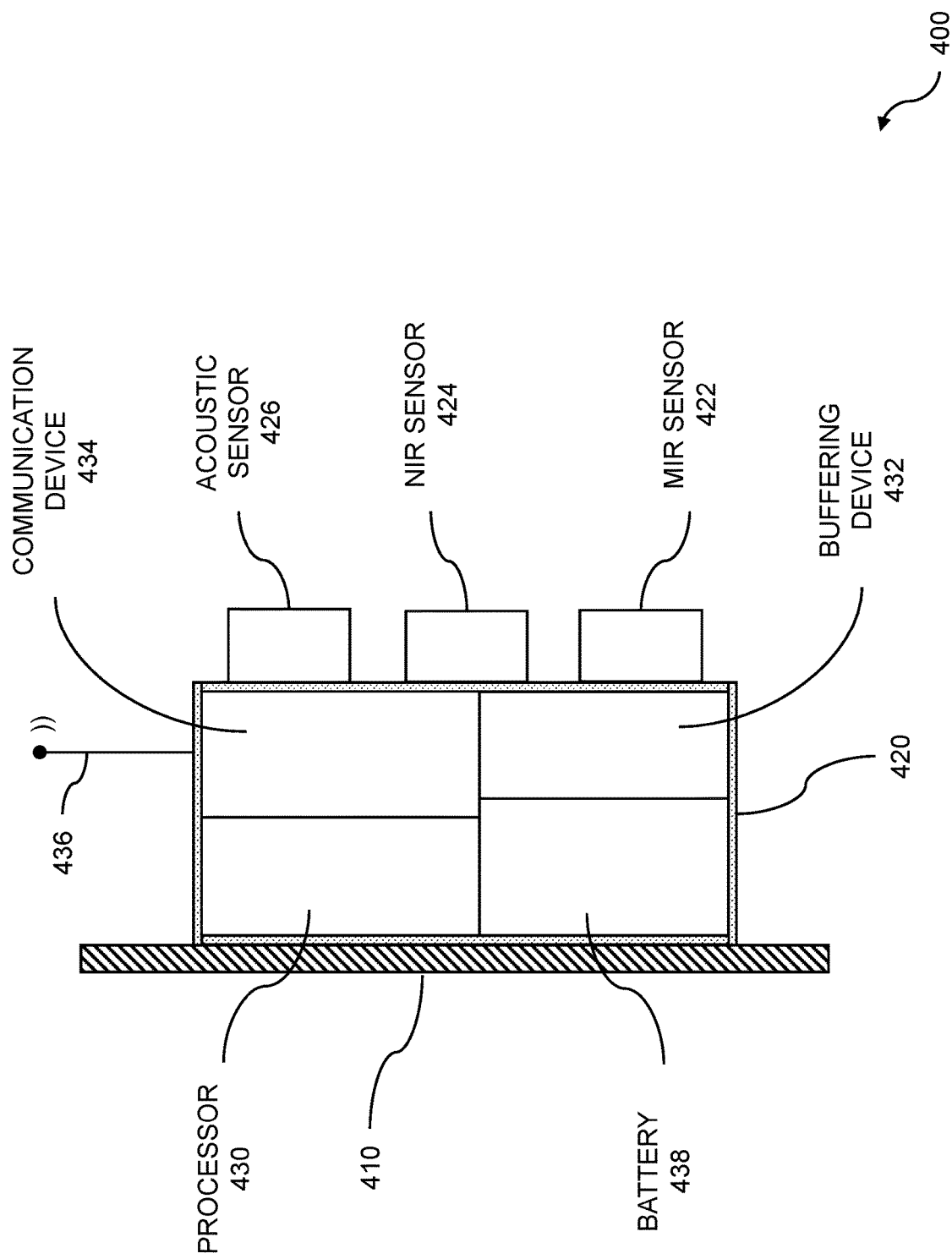
FIG. 4 is a diagram of a cable-free gunshot sensor.

FIG. 4 is a diagram of a cable-free gunshot sensor. A cable-free gunshot sensor enables a gunshot sensor device to interact with other gunshot sensor devices, a network, a server, and so on, without having to rely on a hardwired or cabled collection. The cable-free connection can include a wireless technology such as Wi-fi™, Bluetooth™, Zigbee™, and the like. The cable-free gunshot sensor device can be used for cable-free indoor gunshot detection. The cable-free gunshot sensor device can include a low power gunshot sensor device, such as described throughout. Infrared information is collected using a gunshot sensor device. The infrared information is collected using mid-infrared (MIR) band sensing to provide motion detection. Additional infrared information is buffered using the gunshot sensor device. The additional infrared information is collected using near-infrared (NIR) band sensing, and the buffering is enabled by the motion detection. Acoustic information is collected using the gunshot sensor device. The collecting acoustic information is enabled by the motion detection. A gunshot is detected using the gunshot sensor device. The detecting is based on the additional infrared information and the acoustic information. The detecting can include establishing a temporal correspondence between the gunshot sound and an infrared event. The gunshot sensor device uses cable-free communication to a network. The network is notified of a possible gunshot occurrence, based on the detecting.

A cable-free gunshot sensor is shown 400. The gunshot sensor device that is mounted within an indoor space can be mounted on a building wall 410 or ceiling. The gunshot sensor device can further be mounted to post, a barricade, a partitioning wall, an office cubicle, a piece of furniture, or another object within the indoor space. The gunshot sensor device can comprise a housing 420. The housing can be used to contain the gunshot sensor device, to conceal the device, to protect the device from contamination or tampering, and so on. The housing can enclose some or all of the gunshot sensor device components as discussed throughout. The housing can be affixed to a surface such as a wall or can be temporarily attached to a wall, an object, or another surface. The gunshot sensor can include a mid-infrared (MIR) sensor 422 contained in the housing such as a wall-mountable housing. The mid-infrared sensor can also be contained within other mountable housings, as discussed above. The mid-infrared sensor collects mid-infrared data associated within a mid-infrared band, where the mid-infrared band can include wavelengths between 3 μm and 50 μm. The mid-infrared data can be generated in proximity to the infrared sensor. The gunshot sensor can include a near-infrared (NIR) sensor 424. The NIR sensor can be contained within the housing, contained within another housing, and so on. The near-infrared sensor collects additional infrared information, where additional infrared information comprises near-infrared band data. The near-infrared band can include wavelengths between 0.78 μm and 3 μm. The near-infrared sensor provides the near-infrared data to a buffering device 432 connected to the near-infrared sensor. The buffering device may store the infrared data based on amplitude, noise, characteristics of the infrared data, etc. The buffering device can include a low-power information buffer and a high-power information buffer. The buffering device can enable gunshot event confirmation enabled by the low-power buffer, spurious infrared information filter enabled by the high-power buffer, and the like. The buffering device enables infrared monitoring, where the infrared monitoring can include monitoring for muzzle flashes or other gunshot related events.

The gunshot sensor can include an acoustic sensor 426 contained in the wall-mountable housing, within another mountable housing, and so on. The housing can be mounted on other surfaces, objects, etc., as discussed above. The acoustic sensor can collect high-intensity sounds, where the high-intensity sounds can include sound levels ranging from 120 dB to 160 dB. The high-intensity sounds can include gunshots, explosions, fireworks, vehicle backfires, or other high-intensity acoustic events. The acoustic sensor enables acoustic monitoring. While the acoustic sensor can be enabled to detect only high sound pressure level (SPL) events, the acoustic sensor may also be set to detect low level acoustic data such as talking, shouting, screaming, crying, or other human-generated sounds. The settings associated with the acoustic sensor can include adjustable gain. The gunshot sensor can include a cable-free communication device 434 contained in the wall-mountable housing. The cable-free communication device can enable communication between the gunshot sensor device and other devices such as a gateway; a network; other gunshot sensors; other sensors such as smoke, carbon monoxide, or vibration sensors; and so on. The cable-free communication device can communicate with a repeater device, where the repeater device can forward, relay, or "repeat" data and information sent from the cable-free gunshot sensor. The repeater device can send and receive wireless signals, wired signals, or both wireless and wired signals. The cable-free communication device can use a variety of wireless communication techniques such as Wi-Fi, Bluetooth, Zigbee, etc. The cable-free communication device can be coupled to an antenna 436 or other device appropriate for sending and receiving communication data. The antenna can include a whip, a Yagi, a waveguide, a radome, a dish, or other antenna.

The gunshot sensor can include a processor 430 contained in the wall-mountable housing. The processor can be connected to the acoustic sensor, the buffering device, and the cable-free communication device. The processor can control operation of the gunshot analysis apparatus. The control of operation can include executing code, procedures, subroutines, apps, algorithms, heuristics, etc., appropriate to gunshot detection. The processor can perform a variety of gunshot-related tasks such as increasing infrared or acoustic signal amplitude, reducing noise, flagging characteristics of the infrared and acoustic data, etc. The processor can enable monitoring for possible gunshot occurrences. The monitoring can include monitoring NIR and MTR data or acoustic data for muzzle flashes, high-intensity gunshot sounds, other gunshot related events, or other events such as explosions. The processor can perform other operations relevant to gunshot detection such as correlating a high-intensity gunshot sound to buffered infrared information, notifying a network of a possible gunshot occurrence, identifying a type of firearm, tracking a suspect, etc.

The processor can enable a low-power mode. In embodiments, the collecting and the monitoring comprise a low-power mode of the gunshot sensor device. The low-power mode can be used to minimize power consumption by the gunshot sensor. The processor can be used to support other power level operations. Further embodiments include periodic excursions to a higher-power mode by the gunshot sensor device, where the higher-power mode enables cable-free communication. The cable-free communication can include using the network to communicate with a gunshot detection gateway. Data that can be exchanged using the cable-free communication can include health data relating to the gunshot sensor. In other embodiments, the health data can include one or more of gunshot sensor device identification (ID) data, battery levels, battery drain rate, self-diagnostic data, local communication data, or additional event data. Medium-power modes can also be supported. Further embodiments include enabling excursions from the low-power mode to a higher-power mode to facilitate cable-free communication to the network. The gunshot sensor device can include a battery 438. The battery can be located within the housing and can include a rechargeable battery, a non-rechargeable or single-use battery, and so on. In embodiments, the battery can occupy less than 200 cubic centimeters of volume. The battery is coupled to the gunshot sensor and provides power to the devices and components of the gunshot analysis apparatus. In embodiments, the battery can be recharged, where the recharging of the battery can be based on solar charging, trickle charging, quick charging, constant voltage and/or constant current charging, and the like. In embodiments, the battery can be contained within, on, or next to the wall-mountable housing.

Figure 5:
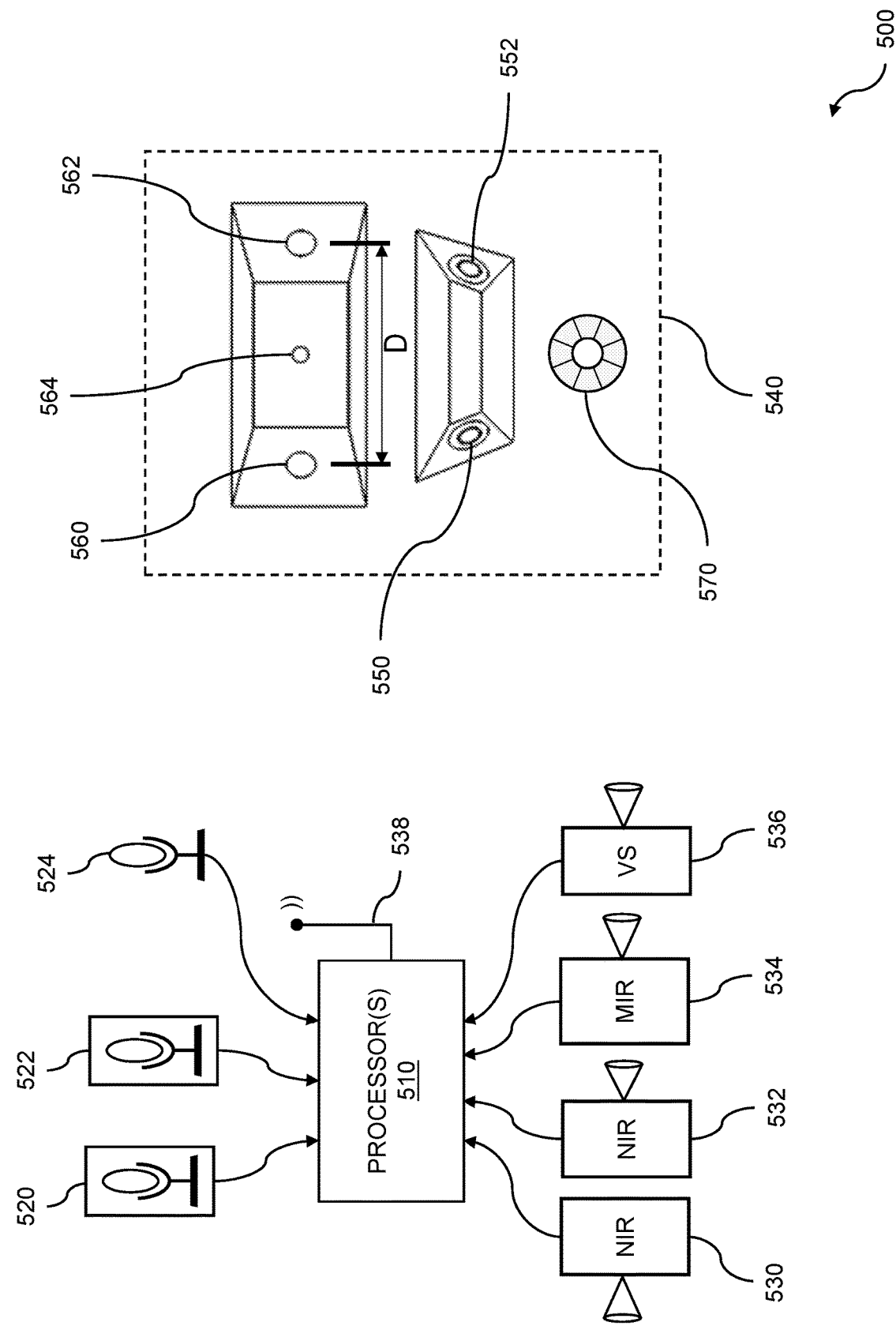
FIG. 5 is a diagram of a gunshot sensor unit.

FIG. 5 is a diagram of a gunshot sensor unit. Indoor gunshot detection, including low power gunshot detection, can be based on infrared information and acoustic information, where both types of information can be obtained within an indoor environment. The infrared information can include mid-infrared (MIR) and near-infrared (NIR) information. The NIR information can be buffered to "enabled," where the buffering can enable gunshot event confirmation and spurious infrared information filtering. Video monitoring can be engaged, and video data can be collected based on the detecting of the gunshot. Video analytics can be performed for tracking a suspected shooter using the collected video. An audio microphone can be activated based on the detection of the gunshot. The tracking of the shooter can be further based on the audio microphone that was activated.

An example of a gunshot sensor unit 500 for indoor gunshot detection is shown. A sensor can include one or more processors 510, two near-infrared sensors 530 and 532, a mid-infrared sensor 534, two acoustic sensors 520 and 522, and a microphone 524. The microphone 524 can be a surveillance microphone that is normally disabled and is only enabled in response to detection of a possible gunshot. The near-infrared sensors 530 and 532 can be used to obtain near-infrared information, where the infrared information can include a muzzle flash, a flash from an explosion, heat from a flame, etc. The mid-infrared sensor 534 can be used to provide motion detection. The acoustic sensors 520 and 522 can be used to detect sound pressure level (SPL) events such as shock waves, where the sound pressure levels of the events can be compared to the SPLs of muzzle blasts from gunfire, explosions, and other similar events. The microphone 524 can be activated based on detecting a gunshot. The microphone 524 can be used for tracking a suspected shooter. The microphone can be activated for a first limited period of time. The first limited period of time can include times when the microphone is active, and any audio information collected during the first limited period of time can be used for a variety of purposes, such as diagnostic purposes. The microphone can remain active for a second limited period of time. The second period of time can be used for information gathering, including tracking information. The information collected from the microphone can be discarded after a third limited period of time. The discarding of information collected by the microphone can serve various purposes including security, confidentiality, and so on.

In some embodiments, the microphone 524 is configured to be operative during normal conditions at a very low gain, such that it only detects sounds in excess of 110-150 decibels. In this way, the microphone 524 can be used to detect sounds from gunshots without picking up other sounds, such as conversations. Once a gunshot is detected, the gain is adjusted so that the microphone 524 can pick up additional information to help law enforcement assess the situation. Thus, once a gunshot is detected, the microphone gain can be adjusted to pick up sounds at a lower sound level (e.g., 50 decibels) so that conversations and other sounds can be detected during the emergency situation. A gunshot sensor can further include a video system 536. The video system 536 can include a video camera and additional sensors used to capture video data and can be configured to activate upon detection of a possible gunshot. Embodiments perform video analytics based on video obtained from the video system 536. The video analytics can track a suspected shooter of the gunshot using the video that was collected.

An example gunshot sensor 540 is shown. The gunshot sensor 540 can include near-infrared (NIR) sensors 550 and 552, mid-infrared (MIR) sensor 570, acoustic sensors 560 and 562, and a microphone 564. The acoustic sensors 560 and 562 can be oriented at different angles and spaced apart by a distance D. In some embodiments, the distance D is 1.25 inches. Since a shock wave from a bullet is directional, one of the acoustic sensors (e.g., 560) might detect the shock wave while the other sensor (e.g., 562) might not. This information can be used as part of a forensics analysis to estimate a trajectory of a fired projectile/bullet. Similarly, the IR sensors 550 and 552 can also be disposed at different angles to increase the range of coverage.

The gunshot sensor can include video cameras and an analyzer. The analyzer can be used to detect a gunshot in an indoor environment based on the infrared information and the acoustic information. In embodiments, the analyzer is implemented by code executing on the one or more processors 510. The analyzer can perform video analytics based on video obtained from the video cameras. The video analytics can track a suspected shooter of the gunshot using the video that was collected. While one configuration of IR sensors, acoustic sensors, and a microphone is shown, other embodiments include different numbers and configurations of the IR sensors, acoustic sensors, and the microphone. In other embodiments, additional IR sensors, acoustic sensors, microphones, video sensors, and processors are present in the gunshot sensor. In some embodiments, the gunshot sensor 540 is sized to fit into a standard 4x4 inch opening such as an opening used for a double light switch or a double electrical receptacle. In this way, gunshot sensors of disclosed embodiments are easily installed within existing infrastructure.

Thus, the gunshot sensor can comprise an infrared sensor and an acoustic sensor. Additionally, the gunshot sensor can further comprise a second infrared sensor and a second acoustic sensor. The infrared sensor and the second infrared sensor can be directed to cover different fields of view. The acoustic sensor and the second acoustic sensor can be set to a threshold above the level of typical verbal communication. The acoustic sensors can be configured to detect shock waves, and/or very loud sounds (e.g., 110-130 decibels or higher). The one or more processors 510 can comprise an analyzer for the gunshot detection system. The analyzer can be integrated into the gunshot sensor unit 500 or can be located in a separate housing remote from the unit. The analyzer can be part of a gateway which receives input from one or more gunshot sensors via a wired, wireless, or optical connection 538. The gateway can be located at a central control center located within a building that has the gunshot sensor system installed. Alternatively, the gateway can be located remotely from the building, for example, at a security monitoring service facility. The analyzer can evaluate the acoustic and IR input from the one or more gunshot sensors. The analyzer can evaluate the shape of the acoustic and IR pulses, the rise time and fall time of the acoustic and IR pulses, the synchronization of the acoustic and IR pulses, the timing of the acoustic and IR pulses, and so on.

Figure 6:
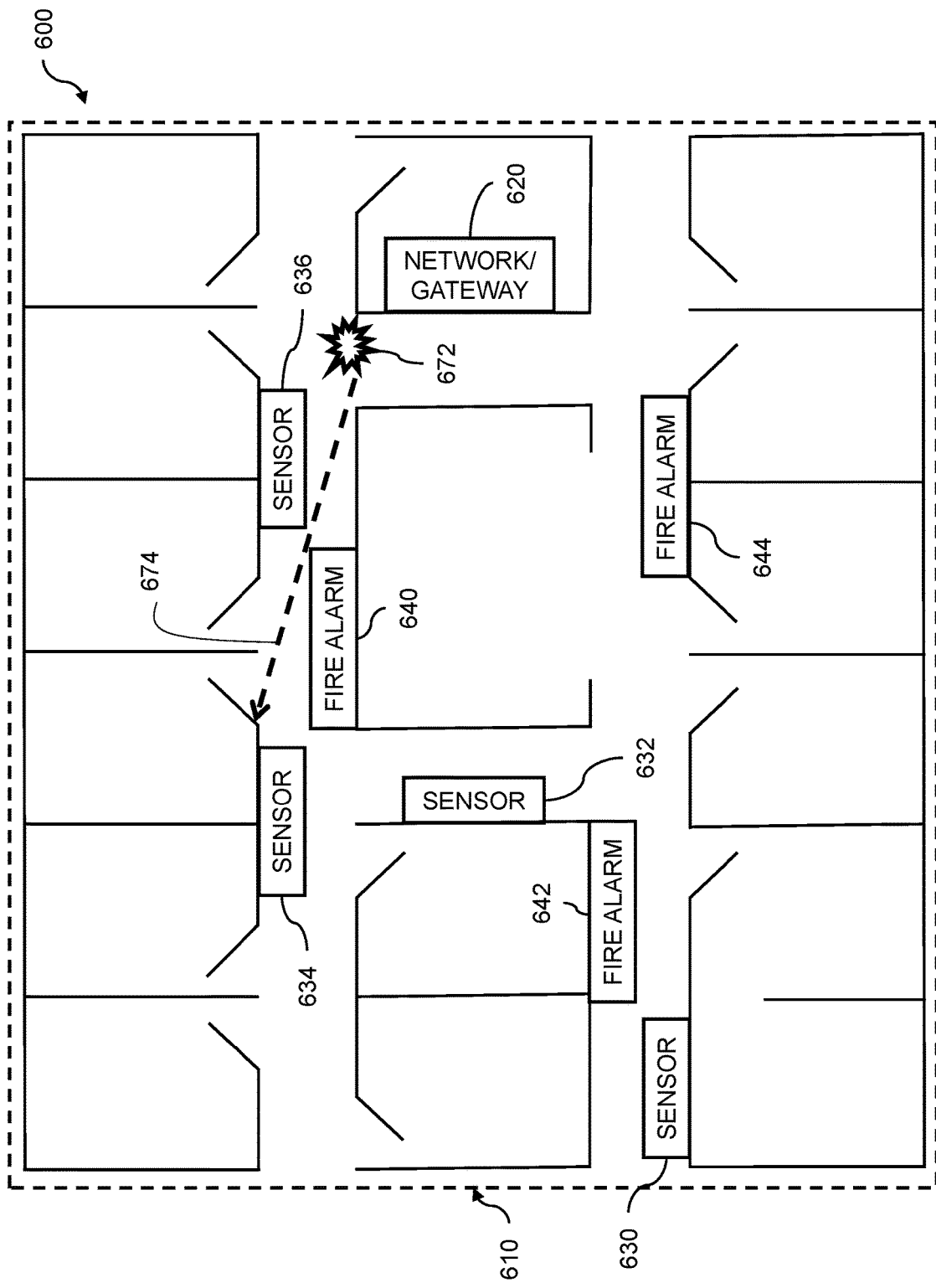
FIG. 6 is an example indoor sensor configuration.

FIG. 6 is an example indoor sensor configuration. A gunshot sensor device, including a device for low power gunshot detection, can be placed within an indoor environment. The indoor environment can include a school, an office building, a hospital, a retail shop, and so on. The indoor environment can be partitioned into offices or other rooms, meeting spaces, open spaces such as lobbies, etc. The indoor environment can include one or more gunshot sensor devices, fire alarms, and other safety and security devices.

The indoor area 600 has a perimeter 610 and can be similar to an office environment, with a plurality of individual rooms. A plurality of gunshot sensor devices 630, 632, 634, and 636 are installed at various positions within the area 600. A plurality of fire alarms 640, 642, and 644 are also installed at various positions within the area 600. A network/gateway 620 is installed within the area 600 and is configured to receive inputs from the plurality of gunshot sensors 630, 632, 634, and 636. In embodiments, the network/gateway 620 communicates with the gunshot sensors via a wired communication interface, such as Ethernet or RS-232. In other embodiments, the gateway 620 communicates with the gunshot sensors via a wireless interface such as Wi-Fi. In such embodiments, each gunshot sensor is further equipped with a Wi-Fi communication interface. The network/gateway 620 can include both wireless and wired communication interfaces. In embodiments, the gateway 620 also receives input from the plurality of fire alarms 640, 642, and 644. In such embodiments, when a fire alarm is activated, information pertaining to the time and duration of each strobe and/or buzzer activation of the fire alarms is communicated to the gunshot sensors, such that the gunshot sensors can compensate for the active fire alarm. In some embodiments, the compensation includes utilization of windowing techniques. In this example, a gunshot is fired at location 672, causing a projectile trajectory as indicated by path 674. In this situation, the gunshot sensor 636 is closest to the path 674. As the projectile/bullet passes by the gunshot sensor 636, a shock wave from the projectile is received by the acoustic sensors within the gunshot sensor 636. In the case of a gunshot sensor such as the gunshot sensor 540 of FIG. 5, the acoustic sensors are spaced apart by a distance D. In this configuration, each acoustic sensor within the gunshot sensor receives the shock wave at a slightly different time. This difference in time can be used to infer information about the gunshot, such as the approximate direction from which the projectile was fired, and/or the approximate speed of the projectile.

The gunshot sensor devices can be deployed throughout an indoor space. The indoor space can include rooms such as hotel rooms, hospital rooms, and classrooms; hallways; common areas such as lounges, meeting rooms, and lobbies; gymnasiums, cafeterias, stairwells, and restrooms; and so on. Therefore, the gunshot sensor devices can be used to determine that a gunshot event has occurred, and this occurrence can be determined independently of the specific position of the gunshot sensor device(s). Thus, the gunshot sensor devices do not require knowledge of their position, and the gunshot detection system does not require knowledge of the specific locations of the sensors. The goal of gunshot detection analysis is to accurately detect that a gunshot has occurred.

Environmental and manmade sources can potentially confound the infrared sensor and the acoustic sensor because the environmental and manmade sources can produce infrared signals and acoustic signals that are similar to those produced by gunshot events. An example of an environmental signal source is a reflected flash of sunlight off a moving vehicle, mirror, or another shiny object. An example of a manmade source is a strobe. Strobes are ubiquitous and are used to serve many purposes, including emergency and danger warnings, alerts, and so on. Strobes are commonly deployed in buildings for purposes such as fire alarms and other warning systems and are routinely displayed on vehicles such as emergency vehicles, forklifts, transport vehicles, carts, heavy equipment, school buses, dangerous equipment, and so on. Other common uses of strobes include specialty lighting with uses for photography, public gathering places (e.g., dance clubs), halogen lights, etc. A strobe flash contains visible light spectra and can "bleed over" into other spectra, including infrared, which can cause a false gunshot detection. In embodiments, analysis is performed to detect that several strobes have occurred and that these occurrences create a problem for gunshot evaluation. In some cases, an environmental cause can be determined and modifications to the environment can be recommended. For instance, a gunshot sensor can be physically moved so that it does not pick up reflected sunlight from cars parked in a nearby parking lot that is visible through a window in a building. Other similar changes can be recommended for the gunshot sensors or for the surrounding environment. Thus, in the example 600, the location of the gunshot sensor devices can be verified at a server using the acoustic generator. Furthermore, in the example 600, the gunshot sensor device can be verified as operational at the gunshot sensor device.

Figure 7:
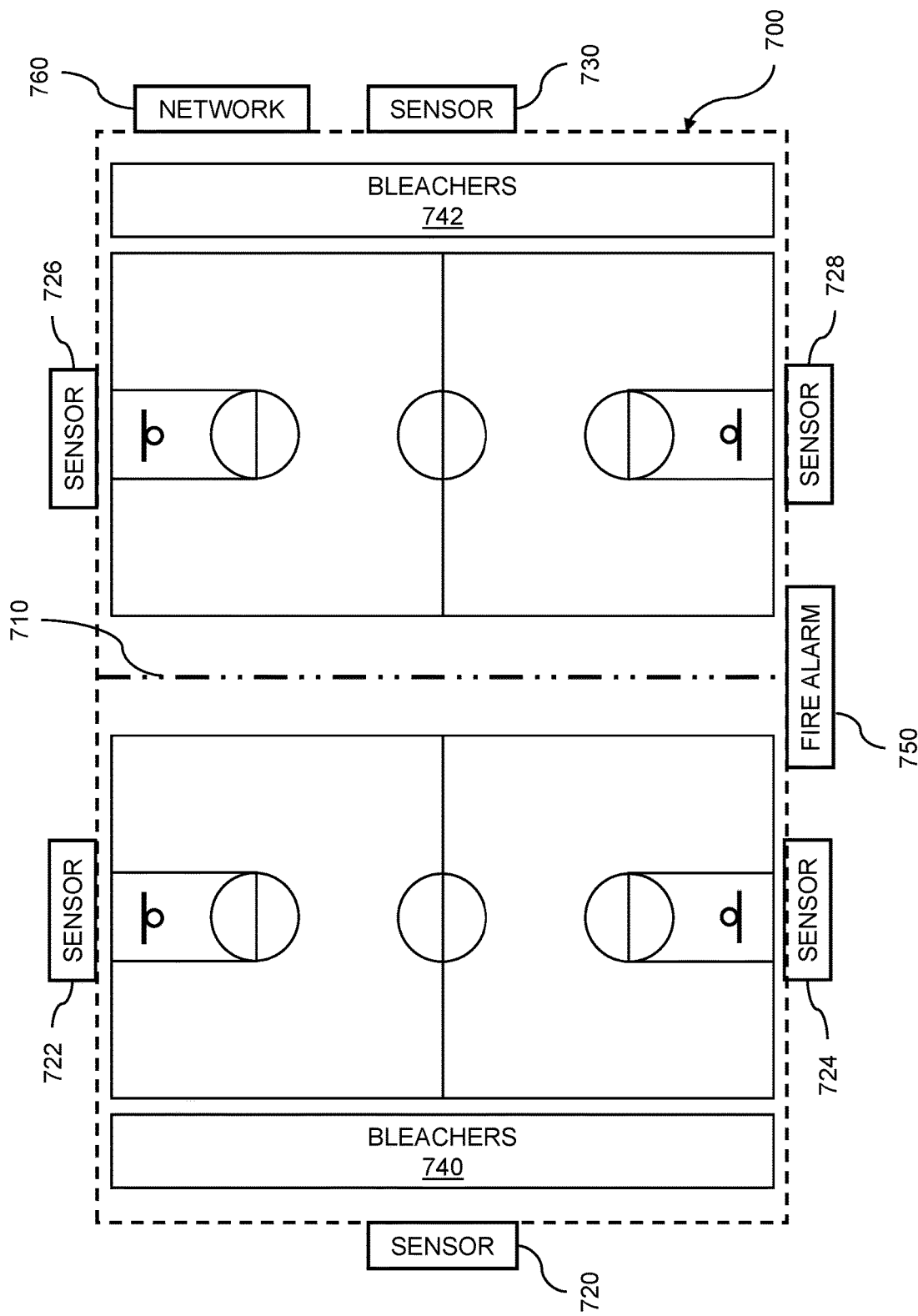
FIG. 7 shows an indoor sensor configuration with six sensors.

FIG. 7 shows an indoor sensor configuration with six sensors in an area 700. The six sensors can be installed within an indoor space including a large indoor space such as a meeting hall, an auditorium, an athletic facility, and so on. The indoor sensor configuration with six sensors supports low power gunshot detection. Infrared information is collected using a gunshot sensor device. The infrared information is collected using mid-infrared (MIR) band sensing to provide motion detection. Additional infrared information is buffered using the gunshot sensor device. The additional infrared information is collected using near-infrared (NIR) band sensing. Acoustic information is collected using the gunshot sensor device, and a gunshot is detected using the gunshot sensor device. The detecting the gunshot is based on the additional infrared information and the acoustic information.

The figure illustrates an indoor sensor configuration with six sensors deployed in a split gymnasium area. As is common in a school gymnasium, a moveable wall 710 can be extended to partition a gymnasium into two smaller areas. In such situations, a six-gunshot sensor configuration can be used, including the gunshot sensors 720 and 730 installed on the longer walls of the split gymnasium, and the gunshot sensors 722, 724, 726, and 728 installed on the shorter walls of the split gymnasium. Loud noises from events, such as opening or collapsing the bleachers 740 and 742, do not trigger false alarms with the gunshot sensors of disclosed embodiments. Even though manipulating the bleachers can make loud noises, such manipulation does not generate shock waves or infrared signatures, and thus disclosed embodiments discern that such activity does not result from gunshots.

A fire alarm 750 is installed within the area 700. A network 760 is installed within the area 700 and is configured to receive inputs from the plurality of gunshot sensors 720, 722, 724, 726, 728, and 730. In embodiments, the network 760 also receives input from the fire alarm 750. In such embodiments, when a fire alarm is activated, information pertaining to the time and duration of each strobe or klaxon activation of the fire alarm is communicated to the gunshot sensors, such that the gunshot sensors can compensate for the active fire alarm. In some embodiments, the compensation includes utilization of windowing techniques. For example, a first gunshot can be fired at a first location within the split gymnasium and a second gunshot can be later fired at a second location within the split gymnasium. Information from each gunshot sensor device that detects the gunshot event can be sent to the network 760, which can then perform analysis on the gunshot information or send the information to another system for further analysis. In embodiments, the network 760 acts as a gateway and sends the gunshot information to a server in the cloud via a computer network such as the Internet. In this way, assailants can neither damage nor destroy the forensic evidence, even if they attempt to destroy equipment at the premises. Analysis in accordance with disclosed embodiments can correlate the IR signatures from the gunshot sensor devices that detect the gunshot events to determine that the inputs received from the sensors all pertain to the same gunshot fired at the location, while the gunshot fired at the second location and detected primarily by the gunshot sensor is a different gunshot event. Hence, disclosed embodiments are well suited for detecting multiple gunshots in an indoor environment, including an indoor environment comprising a gymnasium, a split gymnasium, a long hallway, etc., which is often found in a public building such as a school.

Figure 8:
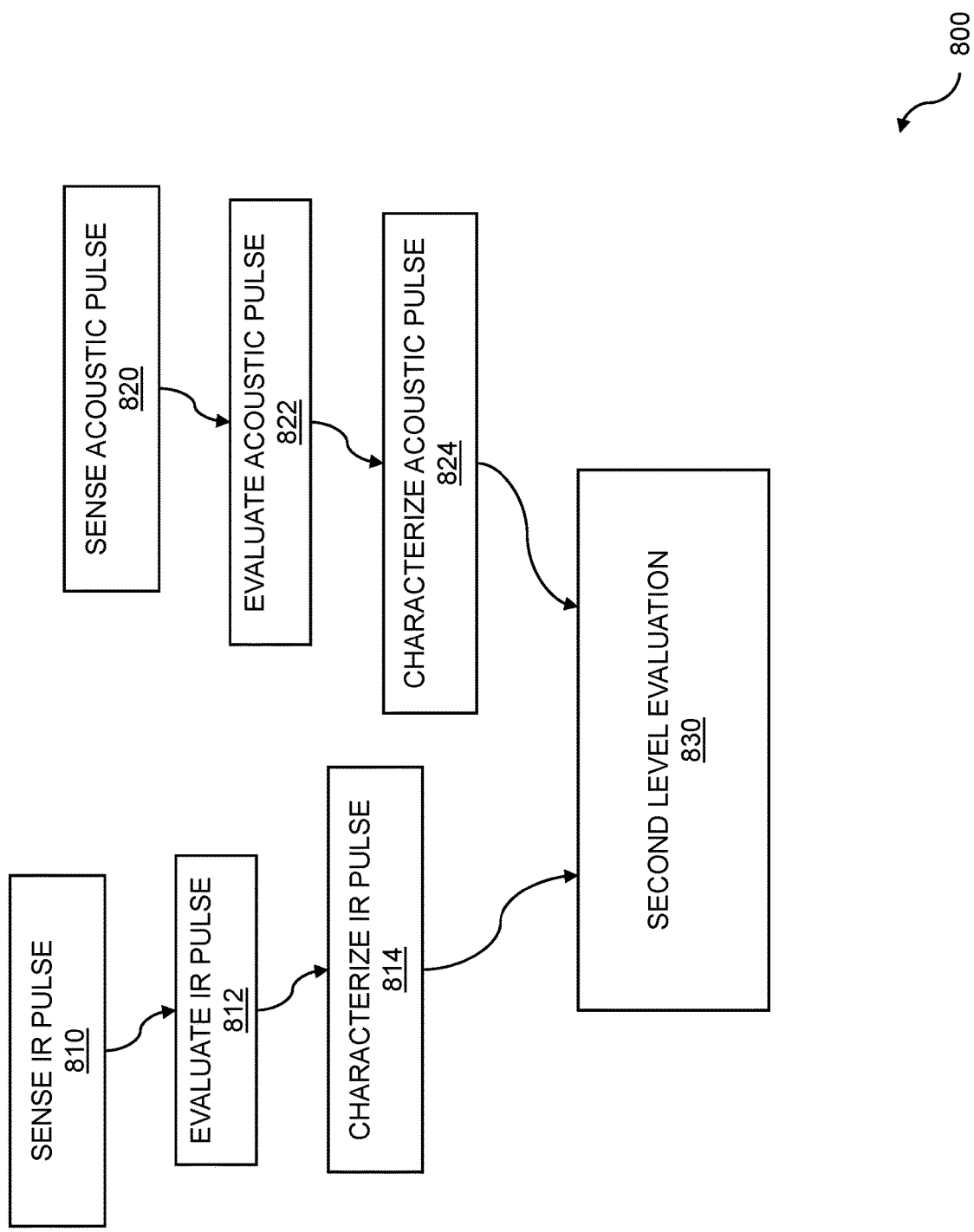
FIG. 8 is a logic flow diagram for signal analysis.

FIG. 8 is a logic flow diagram for signal analysis. The detection of a gunshot, the discrimination of a strobe event, and so on, can be accomplished using one or more signal analysis techniques. The signal analysis techniques can be applied to data including infrared data and acoustic data collected by a gunshot sensor device. The signal analysis techniques enable low power gunshot detection. Infrared information is collected using a gunshot sensor device, where the infrared information is collected using mid-infrared (MIR) band sensing to provide motion detection. Additional infrared information is collected using the gunshot sensor device, where the additional infrared information is collected using near-infrared (NIR) band sensing, and where the buffering is enabled by the motion detection. Acoustic information is collected using the gunshot sensor device, where the collecting acoustic information is enabled by the motion detection. A gunshot is detected using the gunshot sensor device, where the detecting is based on the additional infrared information and the acoustic information.

The flow 800 includes sensing an IR pulse 810. The IR pulse can include a near-IR pulse with a wavelength between 0.78 and 3 μm, a mid-IR pulse with a wavelength between 3 and 50 μm, and so on. In embodiments, the IR pulse has a duration ranging from about one millisecond to about twenty milliseconds. The duration of the IR pulse can vary depending on the firearm that produced the pulse. The flow 800 continues with evaluating the IR pulse 812. The evaluating can include determining peaks along different wavelengths within the range of IR acquisition. The flow 800 continues with characterizing the IR pulse 814. The characterizing can include identification of a particular peak and associating that peak with a known spectral signature from a firearm discharge. The flow 800 includes sensing an acoustic pulse 820. The acoustic pulse can include a shock wave having a characteristic "N" shape that originates from the projectile, and/or a sound wave that originates from the firearm. The flow 800 includes evaluating the acoustic pulse 822. This can include measuring a duration of the acoustic pulse. The flow 800 includes characterizing the acoustic pulse 824. The characterizing can include identification of a particular acoustic pulse and associating that acoustic pulse with a known acoustic signature from a firearm discharge. The flow 800 includes performing a second level evaluation 830. The second level evaluation comprises assembling results from one or more gunshot sensors. The flow 800 can comprise assembling results from the gunshot sensor along with a second gunshot sensor in a gateway device. The assembling can be accomplished independently of location for the gunshot sensor and location for the second gunshot sensor.

In embodiments, the assembling includes computation of a gunshot score, based on multiple sensor inputs. The sensor inputs can include shock wave detection, sound wave detection, and infrared detection. Furthermore, in embodiments, the gunshot score G is computed as $K_1 f_1(S)+K_2 f_2(I)+K_3 f_3(N)$, where S is the shock wave information, I is the infrared information, and N is the sound wave information. The function $f_1$ returns a value based on magnitude of the shock wave. The function $f_2$ returns a value based on the spectral signature of the infrared information. The function $f_2$ can include a correlation function and/or best fit function for an infrared signature resembling that which would result from firearm discharge. The function $f_3$ returns a value based on the magnitude of a sound wave. $K_1$, $K_2$, and $K_3$ are constants. The constants can be set to appropriately weight each of the three inputs. When the gunshot score S exceeds a predetermined level, a gunshot is deemed to have likely occurred. A gateway device can report this information to upstream systems such as campus security systems, law enforcement systems, and the like.

Figure 9:
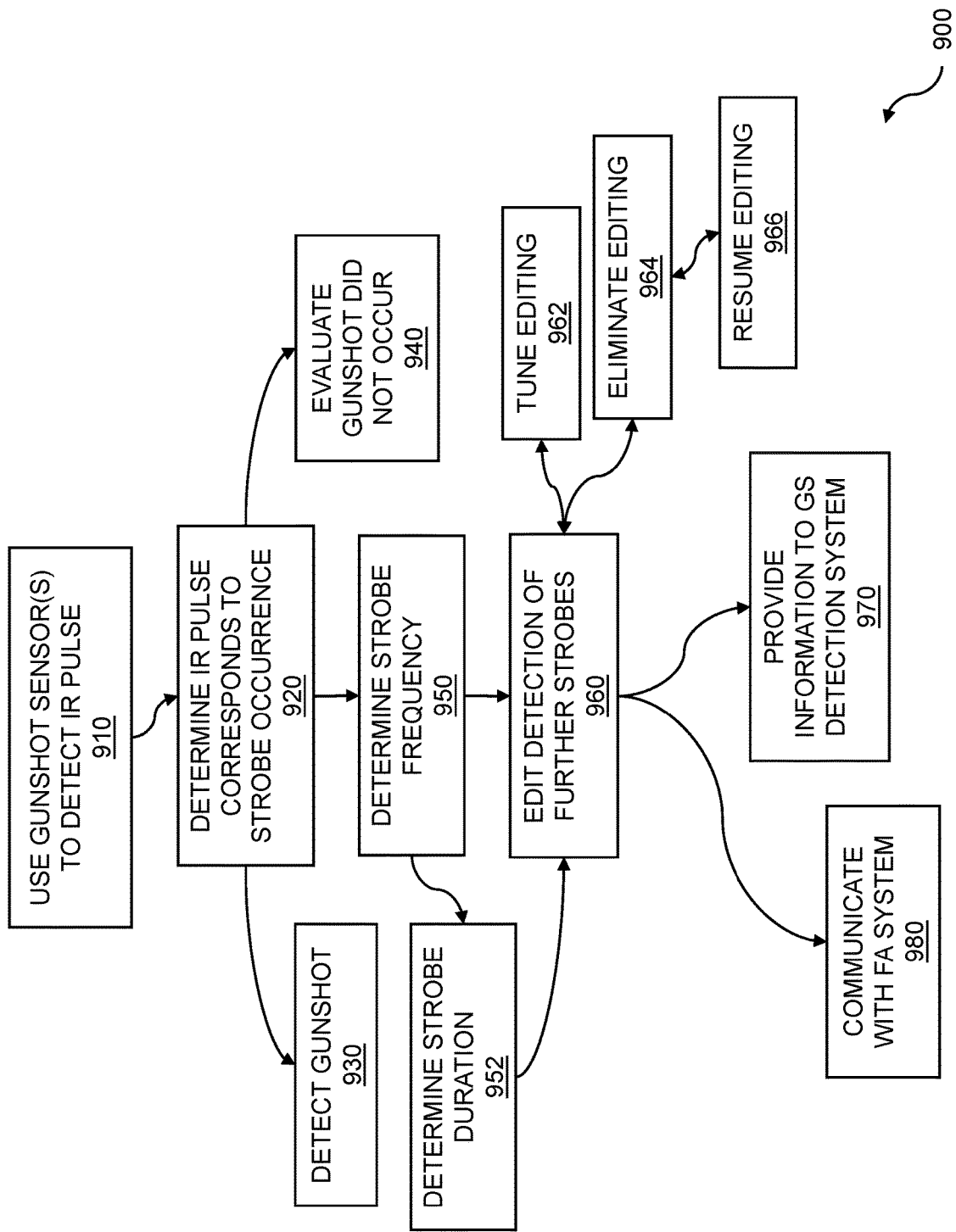
FIG. 9 is a flow diagram for gunshot analysis.

FIG. 9 is a flow diagram for gunshot analysis. Gunshot detection analysis can use a gunshot sensor device to detect an infrared pulse, where the gunshot sensor device can include a mid-infrared (MIR) sensor, a near-infrared sensor, and an acoustic sensor. The infrared pulse can be determined to correspond to a strobe occurrence. Based on the strobe occurrence, a gunshot can be determined to have not taken place. A frequency of strobe occurrences can be determined, as can a duration for the strobes comprising the strobe occurrences. Editing detection can edit out a time window for sensing by the infrared sensors. The editing the strobe occurrences enables low power gunshot detection. The flow 900 includes using one or more gunshot sensor devices to detect an infrared pulse 910, where the gunshot sensor device can include a MIR sensor, a NIR sensor, and an acoustic sensor. In embodiments, the gunshot sensor device includes other sensors such as a microphone, a visual sensor, etc. The gunshot sensor device can be placed in an outdoor location or within an indoor location. In embodiments, the gunshot sensor device is mounted on a wall, on a ceiling, etc., where the wall and/or the ceiling can be in an indoor room, a hallway, a common space such as a lounge or meeting room, and so on.

The flow 900 includes determining that the infrared pulse corresponds to a strobe occurrence 920. A fire alarm can include a strobe that produces a visible alert and a sounder that produces an alarm, codes, voice messages, etc. Thus, a strobe occurrence can comprise a fire alarm. When the fire alarm is activated, the alarm can produce visible strobes and can emit the alarm, codes, voice messages, etc. The fire alarm strobes can be produced at a frequency, and each strobe can have a duration. The light produced by the fire alarm strobe can include infrared light spectra, visible light spectra, and so on. The infrared spectra of the fire alarm strobe can be detected by the infrared sensor included in a gunshot sensor. The flow 900 includes evaluating that a gunshot did not occur 940 based on the strobe occurrence. As discussed above, an activated fire alarm can produce a visual alert in the form of a series of strobes, and an audio alert in the form of an alarm, codes, voice messages, etc. The fire alarm strobes can be detected by the gunshot sensor as infrared pulses. A gunshot produces an infrared pulse from a muzzle flash, and it also produces a high sound-pressure level (e.g., 120 dB to 160 dB) impulse. When a gunshot occurs, both an infrared pulse and a high sound-pressure level impulse are detected. Without the high sound-pressure level, the detected infrared pulse can be attributed to a strobe occurrence that can include a fire alarm strobe.

The flow 900 includes detecting a gunshot 930, while the fire alarm is occurring, based on information from the infrared sensor and the acoustic sensor. As previously stated, a gunshot event includes an infrared pulse and a high sound-pressure impulse. The coincidence in time of the infrared pulse and the high sound-pressure level pulse can be attributed to the gunshot. Since the gunshot emits an infrared pulse and a high sound-pressure level, and the fire alarm emits a sequence of light pulses, where the light pulses include infrared spectra, visible light spectra, etc., detecting a gunshot occurrence can be complicated. In some embodiments, the gunshot occurs at a different time from the strobe occurrence. The gunshot can be differentiated from the fire alarm strobe by the coincidence of an infrared pulse and a high sound-pressure level for the gunshot. For the fire alarm strobe, the acoustic sensor can sense an absence of an acoustic pressure wave that can correspond to a gunshot during a timeframe of the strobe occurrence (e.g., no bang, no gunshot). When a gunshot and a fire alarm strobe produce infrared impulses at substantially the same time, the gunshot cannot be differentiated from the fire alarm strobe. The strobe occurrence can interfere with gunshot detection evaluation because the two strobes can be detected as one infrared pulse, where the infrared pulse can coincide with the high sound-pressure level impulse.

The flow 900 includes determining a frequency of strobe occurrences 950. The determining of the frequency of strobe occurrences can be accomplished using various techniques, such as measuring a period of time between an infrared pulse and the next infrared pulse (seconds/cycle), and inverting the time period to determine frequency (cycles/second). Since the time periods between successive infrared pulses might not be equal, a time tolerance can be determined. The flow 900 includes determining a duration 952 for strobes within the strobe occurrences. The duration for strobes within the strobe occurrences can be determined using various techniques, such as the time difference between a pulse rise and a pulse fall, the time difference between the 50-percent point of a pulse rise and the 50-percent point of a pulse fall, and so on. Since the durations of successive infrared pulses might not be equal, a time tolerance associated with pulse duration can be determined.

The flow 900 includes editing detection of further strobe occurrences 960 based on the frequency of strobe occurrences. Detecting infrared pulses and high sound-pressure waves requires analysis to determine whether the infrared pulses were attributable to a fire alarm or a muzzle blast from a gunshot. Infrared pulses could be falsely tagged as gunshots, or worse, true gunshots could be missed and incorrectly tagged as fire alarm strobes. To reduce the analysis load, infrared pulses that correspond to strobe occurrences can be edited. Editing can include editing out a time window for sensing by the infrared sensor. By enabling the infrared sensor to ignore infrared pulses that correspond to the fire alarm strobe or strobes, the analysis can be reserved for detecting gunshots, tracking gunshots, etc. The editing can be performed based on the strobe frequency and based on the strobe duration. The flow 900 includes tuning the editing 962 as more information on the sequence of strobes is collected. The detection of additional infrared pulses can be used to detect pulse frequency, duration, and tolerance. As more pulses are detected, the editing can be tuned to track the fire alarm strobe occurrences more accurately. Tuning can include better predicting of the time of arrival of the next infrared pulse from the fire alarm strobe, minimizing duration of the editing to reduce the amount of time the infrared sensor detection is edited out, and so on. The flow 900 includes eliminating the editing 964 once the further strobe occurrences discontinue. Fire alarms can produce strobes and alarms, codes, voice messages, etc., for a period of time, and can then stop the strobes for a period of time. During the time that the strobes are not flashing, the editing can be eliminated or suspended, since any infrared pulse that can be detected during the absence of a fire alarm strobe can be a gunshot. The flow 900 includes resuming the editing 966 when further strobe occurrences resume. Just as fire alarms can stop producing strobes, the fire alarms can resume producing strobes. Since the strobes from a given fire alarm are likely to be produced with the same frequency, duration, and so on, as when previously produced, the editing can be substantially similar to the editing previously applied. Instead of re-computing pulse frequency, duration, tolerance, etc. from scratch, resuming the previous editing can permit the editing to resume more quickly and with less processing overhead.

The flow 900 includes providing information 970 to a gunshot detection system, from the gunshot sensor, that a fire alarm is occurring based on the strobe occurrence. The information can be used in modifying detection by other sensors based on the fire alarm occurring. As discussed above, a fire alarm can produce visual alerts in the form of strobes, and audio alerts in the form of alarms, codes, voice messages, and so on. The strobes include infrared light spectra and visible light spectra. By providing information to a gunshot detection system that a fire alarm is occurring, the gunshot detection system can be alerted that some infrared pulses should be attributed to strobe occurrences from a sequence of strobes. The gunshot detection system can begin detecting infrared pulses corresponding to strobe occurrences, editing strobe occurrences, etc. The flow 900 includes communicating between a fire alarm system and a gunshot detection system 980, including the gunshot sensor, so that the fire alarm system can provide a fire alarm notification to the gunshot detection system, and can further evaluate that a gunshot did not occur based on the fire alarm notification. Such communication can be used to enhance the discrimination between fire alarm strobes and gunshot events. The communication can be used to indicate that editing is necessary, to initiate editing, to control editing (e.g., infrared pulse frequency, duration, tolerance, etc.), and so on. Various steps in the flow 900 may be changed in order, repeated, omitted, or the like without departing from the disclosed concepts. Various embodiments of the flow 900 can be included in a computer program product embodied in a non-transitory computer readable medium that includes code executable by one or more processors. Thus, disclosed embodiments comprise evaluating strobe occurrence, based on the infrared information and the acoustic information, and using the strobe occurrence to provide gunshot false alert detection.

Figure 10:
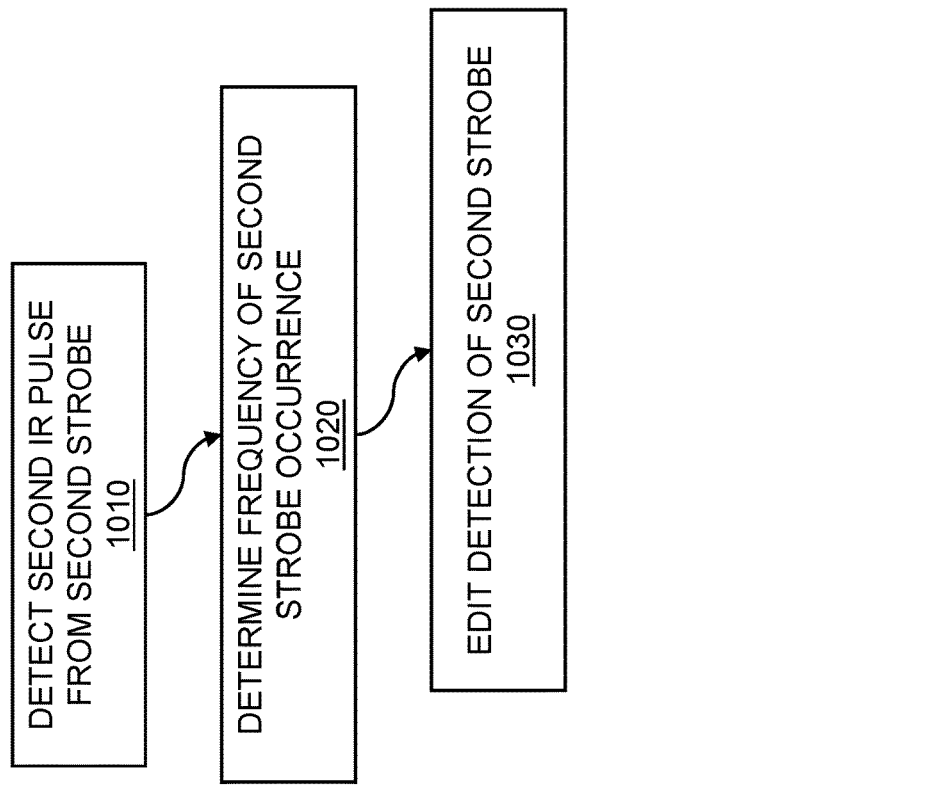
FIG. 10 is a flow diagram for second strobe evaluation.

FIG. 10 is a flow diagram for second strobe evaluation. The flow 1000 can continue from or be part of the previous flow 900. The second strobe evaluation can enable low power gunshot detection. The flow 1000 includes detecting a second infrared pulse corresponding to a second sequence of strobes 1010. The second infrared pulse can be detected with a mid-infrared sensor (MIR), a near-infrared sensor (NIR), or both. The second sequence can emanate from a second strobe source. In certain configurations, a given gunshot detection device can have a line of sight to a plurality of fire alarms. Since fire alarms typically include strobes and sounders, the flashing of the one or more fire alarm strobes can produce infrared pulses that can be similar to infrared pulses generated by muzzle flashes from firearms. As was the case for the first sequence of strobes, the second sequence of strobes can be detected by the MIR and NIR infrared sensors included in a gunshot sensor device. The infrared pulses that result from the second sequence of strobes can be similar to the infrared pulses from the first sequence of strobes. The infrared pulses result from the second sequence of strobes can differ from the infrared pulses from the first subsequence of strobes with regard to frequency of the strobes, intensity (magnitude) of the strobes, etc.

The flow 1000 includes determining a frequency of strobe occurrence for the second sequence of strobes 1020. A time period between a first strobe occurrence for the second sequence of strobes and a second strobe occurrence for the second sequence of strobes can be determined. By inverting the time period, the frequency of strobe occurrence for the second sequence of strobes can be calculated. The duration of strobe occurrence for a given strobe occurrence for the second sequence of strobes can also be determined. The duration of strobe occurrence can be determined based on a time difference between pulse rise time and pulse fall time, the time difference between a 50-percent point in a pulse rise and a 50-percent point in a pulse fall, and so on.

The flow 1000 includes editing detection of a second set of further strobe occurrences 1030 based on the frequency of a second sequence of strobes. As was the case for the first sequence of strobe occurrences, editing detection can occur for the second sequence of strobes. Editing detection can edit out a time window for sensing by the infrared sensor of a gunshot sensor. During the time window that is edited out, the infrared sensor can ignore infrared pulses that can be associated with a second fire alarm strobe. The time window that is edited out can be less than or equal to four percent of a time period between strobe occurrences of the second sequence of strobes. In embodiments, the frequencies for the first and second sequences of strobes are substantially similar. When the frequencies for the strobe occurrences of the first and second sequences of strobes are substantially similar, the infrared sensor can regard the two fire alarm pulses as one pulse, as a pulse wider than a pulse from a single strobe, and so on. In further embodiments, frequencies for first and second strobe sequences are different. When the frequencies for the strobe occurrences of the first and second sequences of strobes are different, then the two sequences of strobes can be detected, where each sequence of strobes has its own frequency and duration. The editing detection can edit out time windows for sensing by the infrared sensor based on the multiple strobe frequencies and the multiple strobe durations. This concept can be extended to three, four, or more strobe sources with corresponding frequencies, durations, and editing. Various steps in the flow 1000 may be changed in order, repeated, omitted, or the like without departing from the disclosed concepts. Various embodiments of the flow 1000 can be included in a computer program product embodied in a non-transitory computer readable medium that includes code executable by one or more processors.

Figure 11:
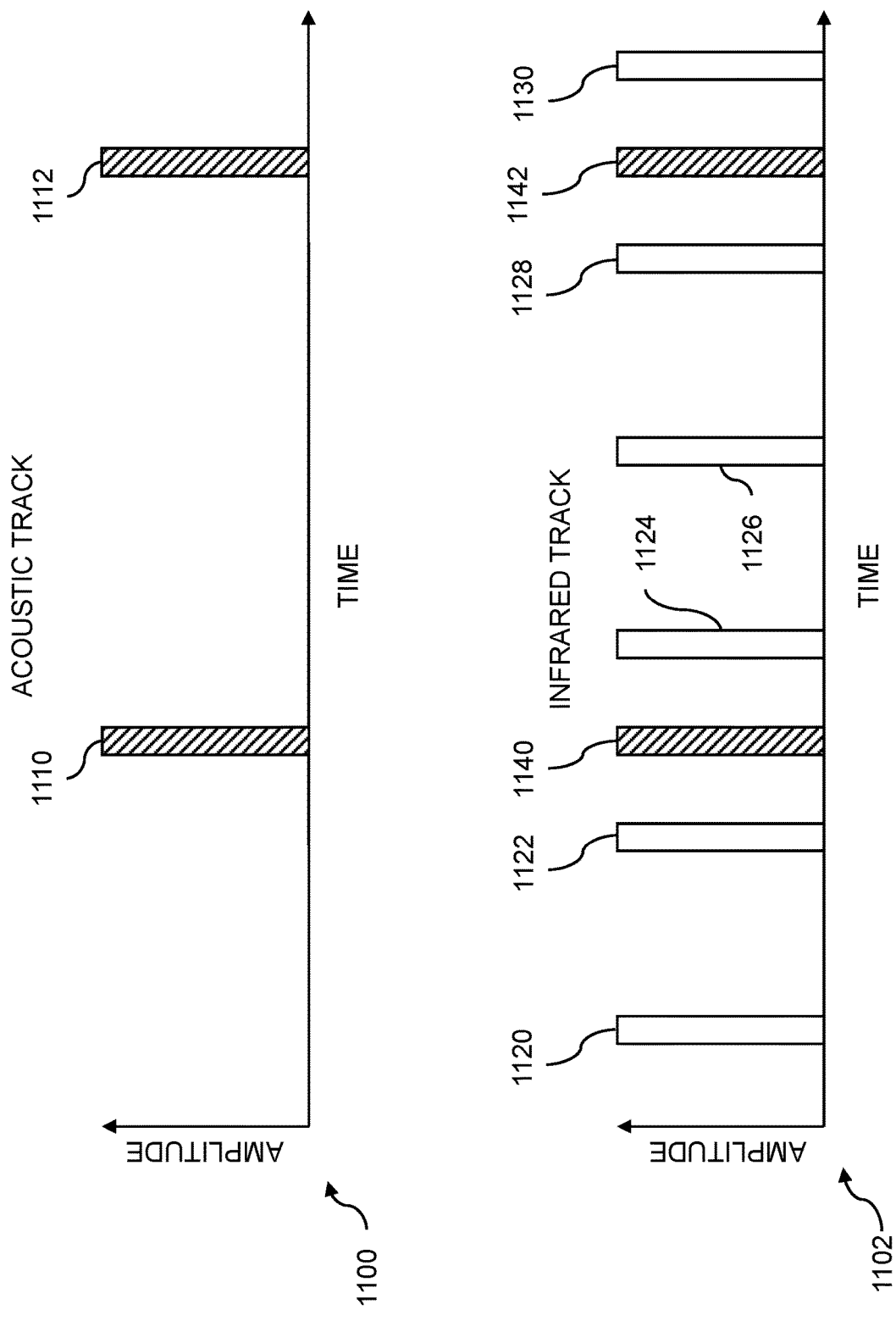
FIG. 11 shows acoustic and infrared tracks.

FIG. 11 shows acoustic and infrared tracks. As stated above, a gunshot sensor device includes a mid-infrared sensor, a near-infrared sensor, and an acoustic sensor. In the event of a gunshot, the gunshot detection device can detect an infrared pulse and an acoustic pulse. The one or more infrared sensors can detect an optical flash, a thermal flash, etc., at the muzzle of a firearm, and the acoustic sensor can detect the muzzle blast. The acoustic sensor might also detect a shock wave when the projectile that is expelled from the firearm is traveling at supersonic velocities. For a gunshot event, both an infrared event and an acoustic event can occur; however, the acoustic event may only comprise a muzzle blast sound and not a shock wave. In some embodiments, only a silenced or highly attenuated sound occurs. Detecting infrared and acoustic tracks can be accomplished using low power techniques for gunshot detection.

An example acoustic track 1100 is shown. In the event of one or more gunshot events, the acoustic sensor can detect high sound-pressure level waves 1110 and 1112. An impulse can result for each gunshot event that occurs. An infrared track 1102 is shown. Infrared pulses can result from a high intensity light strobe such as the strobe coupled to a fire alarm. Such pulses corresponding to a strobe occurrence can include pulses 1120, 1122, 1124, 1126, 1128, and 1130. Infrared pulses can result from an optical flash at the muzzle of a firearm. Such pulses corresponding to an optical flash can include pulses 1140 and 1142. The infrared track 1102 shows that infrared pulses alone might not distinguish between a strobe occurrence and an optical flash. A gunshot can be detected, while the fire alarm is occurring, based on information from the infrared sensor and the acoustic sensor. As shown by the tracks 1100 and 1102, the overlap between the acoustic track pulses such as 1110 and 1112 and the infrared track pulses such as 1140 and 1142 can be associated with one or more gunshots. The coincidence of the acoustic track pulses and the infrared track pulses can be used to detect a true gunshot when the gunshot occurs within a timeframe which is different from the strobe occurrence timeframe. If the pulses are coincident, then the detected infrared pulse is likely a gunshot. In this example, the acoustic sensor can sense a presence of an acoustic pressure wave corresponding to a gunshot during a time window between the strobe occurrences.

Figure 12:
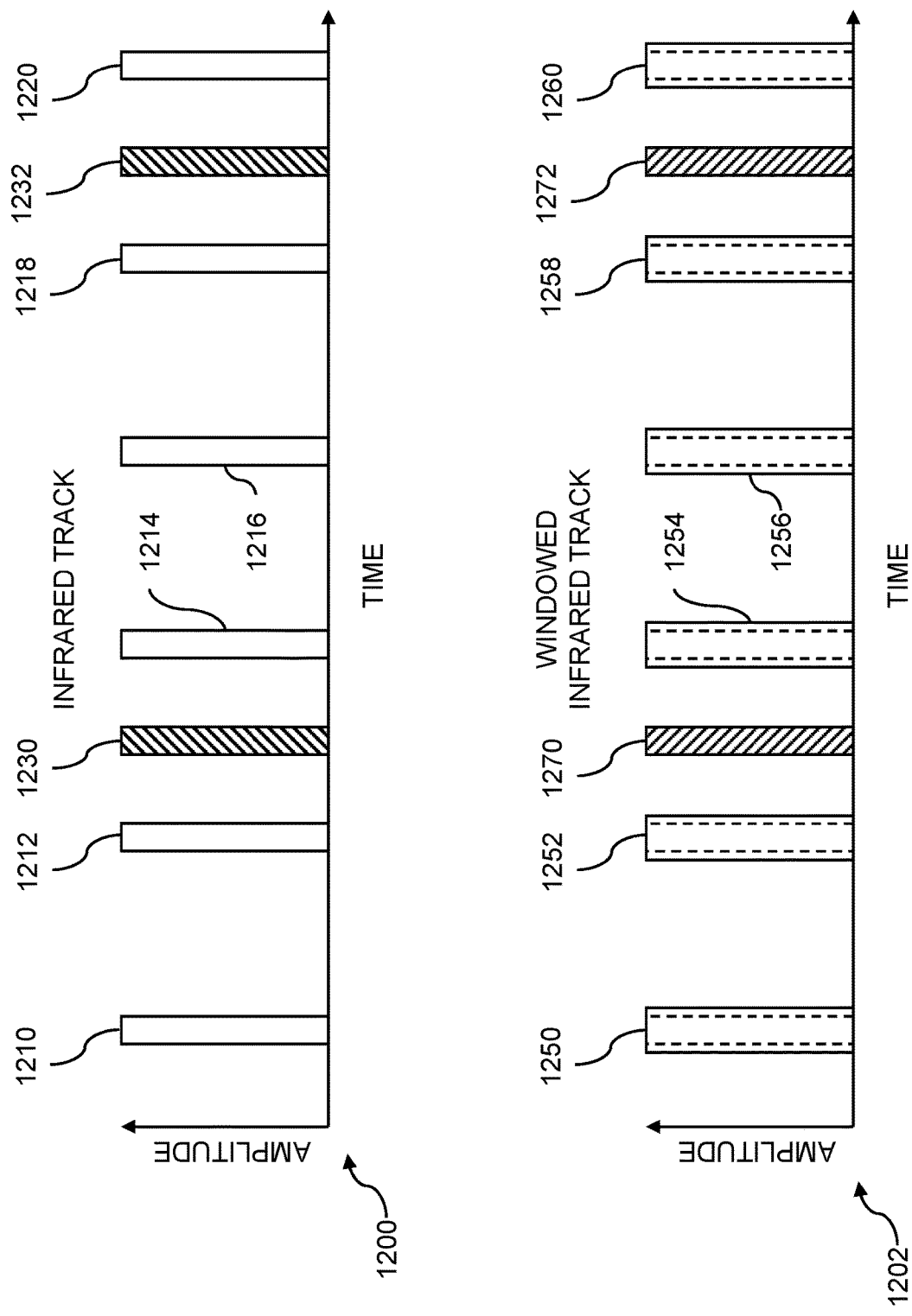
FIG. 12 illustrates infrared and windowed infrared tracks.

FIG. 12 illustrates infrared and windowed infrared tracks. Gunshot detection analysis can use a gunshot sensor device to detect an infrared pulse, where the gunshot sensor device can include a mid-infrared sensor, a near-infrared sensor, and an acoustic sensor. The infrared pulse can be determined to correspond to a strobe occurrence. A gunshot can be evaluated to have occurred based on infrared pulse detection transpiring between strobe occurrences. A frequency of strobe occurrences can be determined, as can a duration for the strobes within the strobe occurrences. Editing detection can edit out a time window for sensing by the infrared sensor. The windowed infrared tracks enable low power gunshot detection. An infrared track 1200 is shown. As time progresses, a train of infrared pulses at the same amplitude or at differing amplitudes can occur, where the pulses can correspond to strobe occurrences from a strobe. The strobe can be associated with an ongoing fire alarm. In the example 1200, using a gunshot sensor to detect an infrared pulse can detect an infrared pulse corresponding to a strobe. The strobe occurrence can be part of a sequence of strobes. Pulses 1210, 1212, 1214, 1216, 1218, and 1220 can correspond to such a sequence of strobes. An infrared pulse can correspond to one or more gunshots, represented by pulses 1230 and 1232. A frequency of strobe occurrences can be determined by detecting a train of pulses, determining the period between pulses, and inverting the period to find frequency. The duration of strobes within the strobe occurrences can be determined. The duration of strobes can be determined by calculating the time difference between the time at which a pulse rises and the time at which a pulse falls. Pulse duration can be measured between the 50-percent points of the rising waveform and the falling waveform, etc.

By determining a frequency and duration of strobe occurrences for a sequence of strobes, editing detection of the set of strobe occurrences can take place. The editing detection is based on the frequency and duration of the sequence of strobes. A windowed infrared track 1202 is shown. The editing detection edits out a time window for sensing by the infrared sensor. During the edited time window, pulses resulting from infrared signals detected by the gunshot detector can be ignored. By ignoring signals, processing and analysis resources can be reserved for analyzing other signals that have not yet been identified, or signals that have been identified and are being tracked. The edited time window can be less than or equal to four percent of a time period between strobe occurrences. The small edited time window can avoid missing infrared pulses that might actually be gunshots. Based on the frequency of strobe occurrence for the sequence of strobes, or pulses, 1210, 1212, 1214, 1216, 1218, and 1220, the strobes from the sequence can be edited as strobes, represented by pulses 1250, 1252, 1254, 1256, 1258, and 1260. Since the infrared pulses 1230 and 1232 can correspond to gunshot events, the pulses 1230 and 1232 can be left unedited as pulses 1270 and 1272, respectively. That is, the unedited pulses such as infrared pulse 1270 can occur within a time window, such that when an unedited pulse is detected, the unedited infrared pulse can be determined to be coincident with an acoustic pulse (not shown), when accounting for the difference in the propagation speeds of light and sound. In some embodiments, the fire alarm(s) communicate an activated status to a gateway, which then conveys the information to the gunshot sensors. The communication can include information pertaining to the fire alarm buzzer and/or strobe pattern. In response, the gunshot sensors can perform the aforementioned windowing based on the information conveyed from the fire alarm(s).

Figure 13:
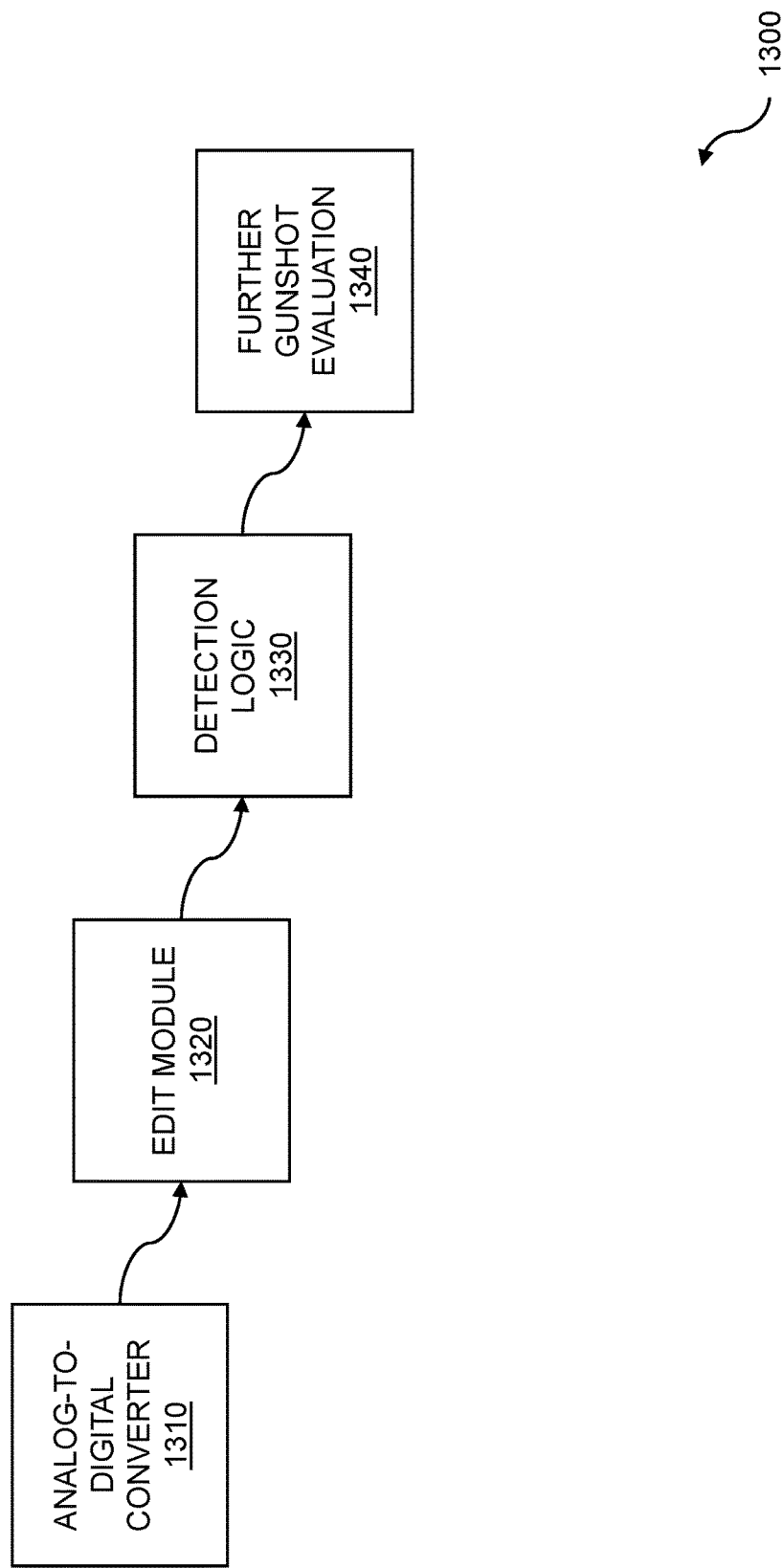
FIG. 13 shows signal editing components.

FIG. 13 shows signal editing components. Gunshot detection analysis can use a gunshot sensor device to detect an infrared pulse. The gunshot sensor device can include one or more infrared sensors, where the infrared sensors can include a mid-infrared (MIR) sensor, a near-infrared (NIR) sensor, and so on. The gunshot sensor device can further include an acoustic sensor. The example 1300 shows signal editing components for low power gunshot detection analysis, where the analysis can take place with an ongoing fire alarm. The signal editing components can be included in a gunshot sensor device or can be external to the gunshot sensor device. The signal editing components can be implemented in hardware, software, or a combination thereof. The signal editing components can include one or more processors and software to configure the one or more processors. The signal editing components can be implemented with integrated circuits, programmable or configurable devices such as field programmable gate arrays (FPGAs), custom or specialty chips such as application specific integrated circuits (ASICs), cloud-based components or systems, and so on. The gunshot sensor device can include an analog-to-digital converter 1310 and logic to perform gunshot detection. The analog-to-digital converter 1310 can be interposed between the one or more infrared sensors and the logic. The logic can be editing logic, where the edit logic can edit out spurious or other unwanted signals such as fire alarm strobes (discussed below). The analog-to-digital converter can operate on the pulses such as MIR and MIR pulses received from the infrared sensor or sensors, and can operate on the impulses received from the acoustic sensor or sensors. The analog-to-digital converter can perform various operations including pulse detection, filtering, determining pulse frequency, determining pulse duration, and so on.

The analog-to-digital converter can be coupled to an edit module 1320. As previously stated, editing can include editing detection, where editing detection can edit out a time window for sensing by the one or more infrared sensors. The editing can be based on a frequency of strobe occurrences, on a duration of strobes within the strobe occurrences, and so on. The editing detection can be accomplished between the analog-to-digital converter and the logic to perform gunshot detection. The signal editing components can include detection logic 1330. The detection logic 1330 can be coupled to the edit module 1320. The logic to perform gunshot detection can include one or more processors, as well as software to configure the one or more processors to perform the gunshot detection. The gunshot detection can include determining that a given infrared pulse corresponds to a strobe occurrence and can evaluate whether a gunshot did or did not occur. The detection technique can be edited. The editing detection can be accomplished by the one or more processors based on software to configure the processors to perform the editing. The editing detection can include loading software, where the software can be coded to implement a variety of algorithms, heuristics, and so on. The editing can be performed before the gunshot detection. The editing can include filtering, signal shaping, scaling, attenuation, discrimination, anti-aliasing, cross-correlation, and so on. The signal editing components can include further gunshot evaluation 1340. The further gunshot evaluation component 1340 can be coupled to the detection logic 1330. The further gunshot evaluation can include detecting a gunshot with an ongoing fire alarm, detecting a gunshot with multiple ongoing fire alarms, detecting multiple gunshots, etc. The further gunshot evaluation can include identifying weapons, identifying shooters, tracking shooters, notifying emergency services or law enforcement, and so on. Various embodiments of the example 1300 illustrating signal editing components can be included in a computer program product embodied in a non-transitory computer readable medium that includes code executable by one or more processors.

Figure 14:
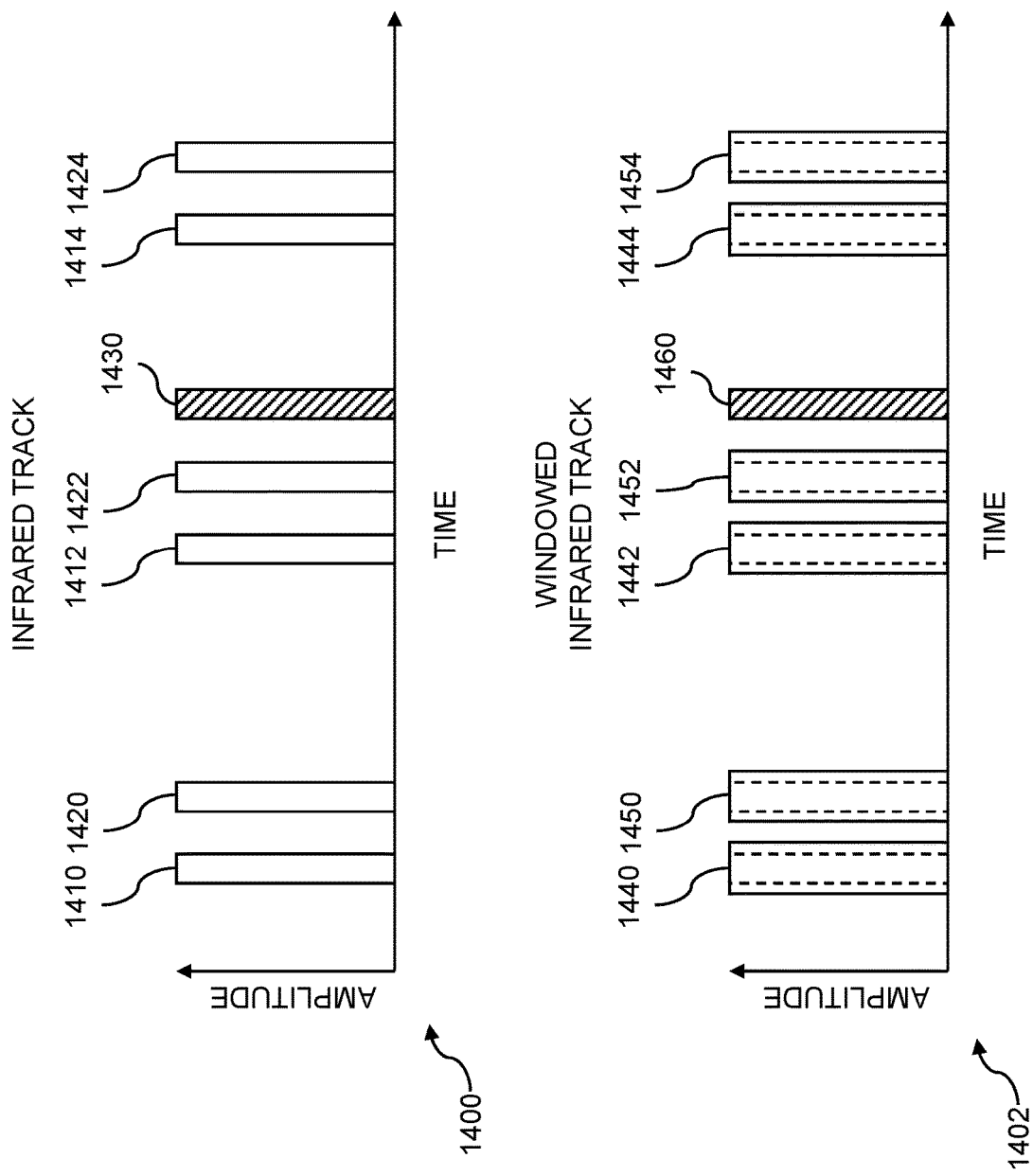
FIG. 14 illustrates editing for multiple strobes.

FIG. 14 illustrates editing for multiple strobes. In the presence of multiple strobes, editing detection can edit out multiple time windows for sensing by an infrared sensor. An infrared track 1400 is shown. As time progresses, a train of infrared pulses at the same amplitudes or at differing amplitudes can occur, and the pulses can correspond to strobe occurrences from one or more strobes such as fire alarm strobes. The infrared pulses can be based on one or more designations of infrared light such as near-infrared, mid-infrared, and so on. The buffering can be based on buffering NIR information, and using the buffered information to filter spurious infrared information. The editing for multiple strobes enables low power gunshot detection. In track 1400, using a gunshot device to detect an infrared pulse can detect a second infrared pulse corresponding to a second sequence of strobes. The gunshot sensor device can include a mid-infrared (MIR) sensor, a near-infrared (NIR) sensor, and so on. Pulses 1410, 1412, and 1414 can correspond to strobe occurrences of a first strobe, and pulses 1420, 1422, and 1424 can correspond to strobe occurrences of a second strobe. In practice, any number of strobe occurrences can be present. An infrared pulse can correspond to a gunshot, represented by pulse 1430. As was the case for a single strobe, where a frequency of strobe occurrences for the first sequence of strobes was determined, a frequency of strobe occurrences for the second sequence of strobes can also be determined. The results of determining a frequency of strobe occurrences, for a second sequence of strobes, can be editing detection of a second set of further strobe occurrences, based on the frequency of second sequence of strobes. A windowed infrared track 1402 is shown. Based on the frequency of strobe occurrence for the first sequence of strobes, represented by pulses 1410, 1412, and 1414, the strobes from the first sequence can be edited to pulses 1440, 1442, and 1444, respectively. Similarly, based on the frequency of strobe occurrence for the second sequence of strobes, represented by pulses 1420, 1422, and 1424, the strobes from the second sequence can be edited to pulses 1450, 1452, and 1454, respectively. Since the infrared pulse 1430 can correspond to a gunshot event, the pulse 1430 can be left unedited as pulse 1460.

Editing detection can be based on the frequencies and durations of sequences of strobe occurrences. Editing detection to edit out a time window for sensing, by the infrared sensor device, infrared pulses corresponding to both the first and second sequences of strobe occurrence, can be dependent not only on the frequencies of the first sequence of strobe occurrences and the second sequence of strobe occurrences, but also on the durations of each sequence of strobe occurrences and the separation between the two sequences. Frequencies for the strobe occurrences and the second sequence of strobes can be substantially similar. Differentiating between the two sequences can be complex since it can be difficult to differentiate between the beginning of one pulse in one sequence and the ending of another pulse in another sequence. When the pulse frequencies are substantially similar, the editing can be accomplished by increasing the value of the duration for strobes within the first sequence of strobe occurrences, such that the increased duration value covers both the first sequence of strobe occurrences and the second sequence of strobe occurrences. However, frequencies for the strobe occurrences and the second sequence of strobes can also be different. In this latter case, detection of strobe occurrences of the first sequence of strobes and detection of strobe occurrences of the second sequence of strobes can differentiate between the two sequences of strobes. The widths of the editing windows can thus be determined individually based on the durations of the two sequences of pulses.

Figure 15:
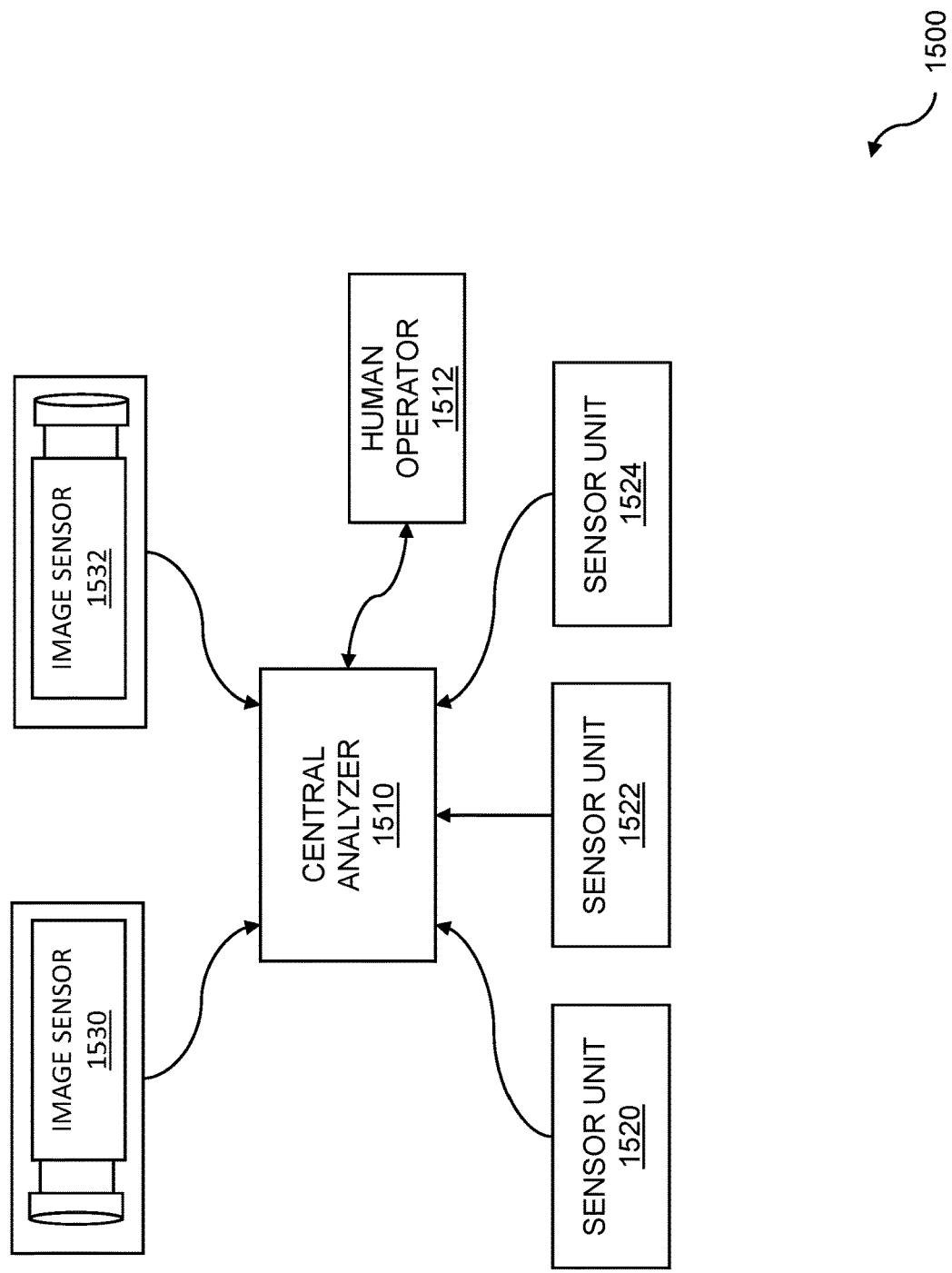
FIG. 15 is an example system illustrating sensors, cameras, and a central analyzer.

FIG. 15 is an example system illustrating sensors, cameras, and a central analyzer. Indoor gunshot detection can be based on infrared information and acoustic information, where both types of information can be obtained within an indoor environment. The infrared information can include IR information that includes various wavelengths, such as near-infrared, mid-infrared, far-infrared, and so on. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. Sensors, cameras, and a central analyzer can be used for indoor gunshot detection with components of a system 1500. A central analyzer 1510 can be used for low-power gunshot detection in an environment such as an indoor environment. The central analyzer can control the one or more sensor units and image sensors. The central analyzer can be used to detect a gunshot, engage video collection, and perform video analytics. The central processor can interact with a human operator 1512. The human operator can interact with the central analyzer to provide oversight. The human operator can tag a person of interest. The tagging by the human operator can be used along with video analytics for tracking the person of interest. The central analyzer can be coupled to a plurality of gunshot sensor units 1520, 1522, and 1524, a plurality of image sensors 1530 and 1532, and so on. The gunshot units can include sensors for mid-infrared (MIR) information, near-infrared (NIR) information, and high acoustic level information. The central analyzer can obtain infrared information including MIR and NIR information, and acoustic information, from the sensor units. The central analyzer can be coupled to image sensors 1530 and 1532. The image sensors can be engaged by the central analyzer. The image sensors that can be used can include video cameras, still cameras, or other digital image collection systems and techniques. The central analyzer can perform video analytics, where the video analytics utilize image classifiers. The image classifiers can be used to identify a firearm type. A suspected shooter can be identified based on the video analytics. As mentioned above, with oversight from the human operator 1512, where the operator can tag a person of interest, tracking of the person of interest can be conducted using video analytics performed by the central analyzer.

Figure 16:
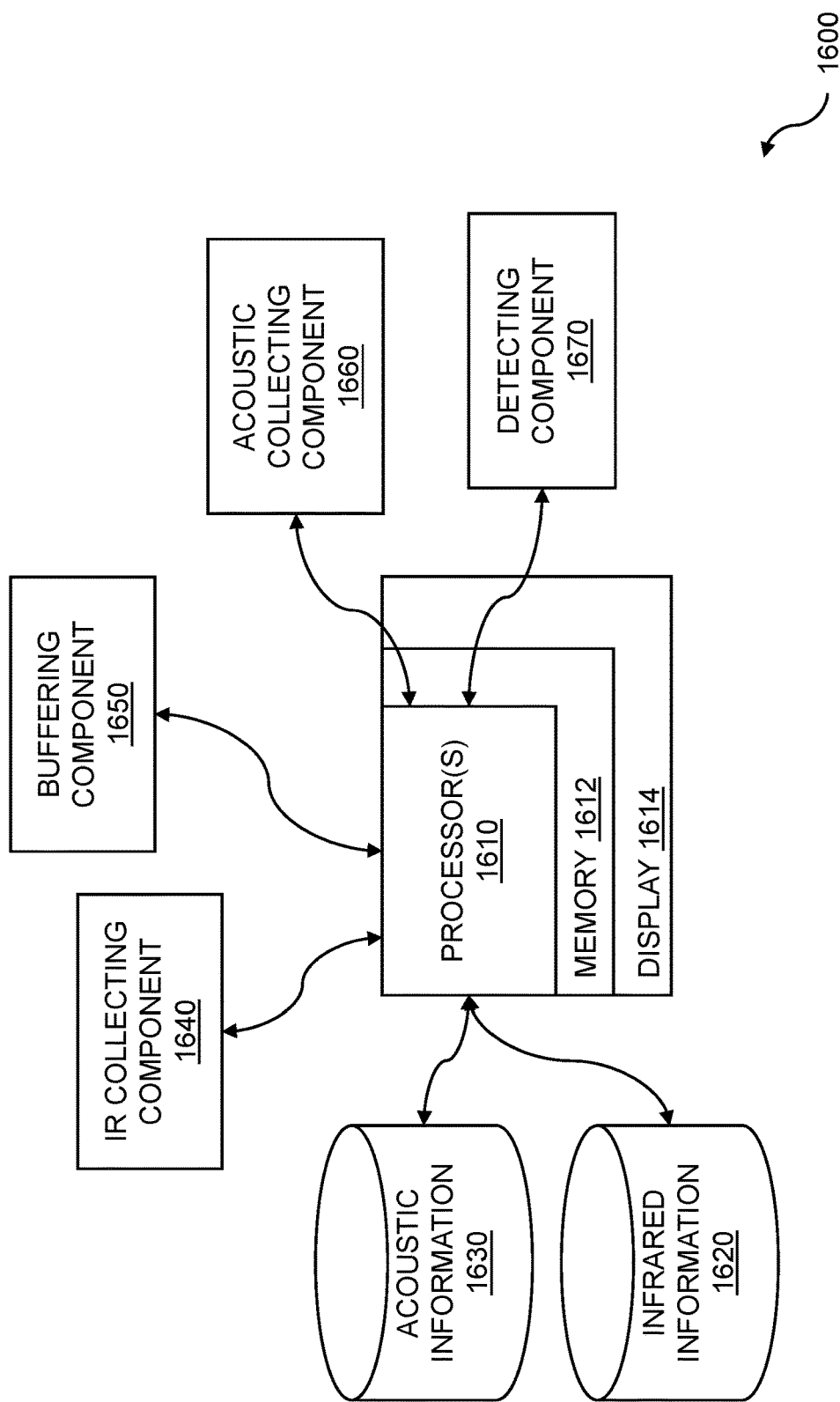
FIG. 16 is a system diagram for low power gunshot detection.

FIG. 16 is a system diagram for low power gunshot detection. The system 1600 can include a plurality of gunshot sensor units used for gunshot analysis, wherein each of the plurality of gunshot sensor units comprises: a mid-infrared (MTR) band sensor located in a housing, wherein the mid-infrared band sensor provides motion detection; a near-infrared (NIR) band sensor co-located in the housing, wherein the near-infrared band sensor initiates buffering of NIR information, based on the mid-infrared band sensor detecting motion; an acoustic sensor co-located in the housing, wherein the acoustic sensor collects high-intensity sounds and enables acoustic monitoring; and a battery, wherein the battery is connected to provide power to the sensors, and wherein the battery is contained within, on, or next to the housing. NIR signal information received by the NIR sensor can include spurious high-power IR information due to a strobe from a fire alarm. The buffering can be used for filtering. In the system 1600, the high-power infrared information buffer can enable spurious infrared information filtering. The spurious information filtering can include fire alarm filtering. A fire alarm can emit IR radiation, where the IR radiation is associated with a strobe. The IR radiation from the fire alarm can be periodic, and can be synchronized with the strobe flashes. In the system 1600, the spurious infrared information filtering can include high-level ambient lighting filtering. The high-level ambient lighting filtering can include sunlight, such as direct sunlight, high intensity lamps, safety lighting, search lights, etc. The high-level ambient lighting can include high-intensity infrared information from an ongoing fire alarm strobe light. The system 1600 further includes filtering spurious infrared information, which filters high-level ambient lighting. The system 1600 can include one or more processors 1610 coupled to a memory 1612 which can store and retrieve instructions and data, and a display 1614. The display can be used to show acoustic information, infrared information, correlating information, matching information, and so on. The display can be used to show notification information.

The system 1600 can include a collection of infrared information 1620. The infrared information can include IR information collected using a gunshot sensor within the indoor environment. The IR information can include IR information collected from a potential gunshot event, spurious IR information from high-intensity IR pulses such as from a fire alarm, lightning flashes, high-level ambient light, etc. The IR information can include IR test information, IR calibration information, and the like. The IR information can include MIR and NIR information. The system 1600 can include a collection of acoustic information 1630. The acoustic information can include acoustic information collected using the gunshot sensor within an indoor environment, an outdoor environment, or both. The acoustic event can include acoustic information collected from a potential gunshot event, fireworks, an explosion, a high intensity acoustic event such as an alarm or car horn, a vehicle backfire, and the like. The high intensity acoustic event can include a naturally occurring acoustic event such as thunder, an earthquake, etc. The acoustic information can include other acoustic information such as acoustic signatures for various types of acoustic events, acoustic test information, acoustic calibration information, and so on.

The system 1600 can include an IR collecting component 1640. The IR information that is collected can be based on various categories of IR light such as near-infrared (NIR) light with wavelengths between 0.76-3 µm; mid-infrared (MIR) light with wavelengths between 3-50 µm; far-infrared (FIR) light with wavelengths between 50-1000 µm, etc. The collecting of the infrared information 1620, or the collecting of the acoustic information 1630, can occur using the one or more processors 1610, or can occur using other processors. The collecting of the infrared information 1620 or the collecting of the acoustic information 1630, can be accomplished using a cable-free access to a wired or wireless computer network, a wired or wireless sensor network, the Internet, and so on. The acoustic information 1630 can be collected within an indoor environment using a gunshot sensor device, where the gunshot sensor device can use low power gunshot detection and where the gunshot sensor device can be powered by a battery. The infrared information 1620 can be collected within the indoor environment using the gunshot sensor device, where the infrared information can be buffered within the gunshot sensor device. The infrared information or the acoustic information can be collected from a plurality of infrared sensors including NIR and MIR sensors, and acoustic transducers, respectively. The infrared sensors can be pointed in different directions to cover various fields of view, and the acoustic sensors can also be pointed in different directions. The acoustic sensors can be attenuated so that only high intensity acoustic events can be detected. The acoustic sensors can be configured so that they cannot detect voices.

The system 1600 can include a buffering component 1650. The buffering component can use the gunshot sensor device to buffer various wavelengths of IR information. The buffering component can include hardware or software for buffering additional infrared information using the gunshot sensor device, wherein the additional infrared information is collected using near-infrared (NIR) band sensing, and where the buffering is enabled by the motion detection. The buffering can be accomplished using one or more buffers. In embodiments, the additional infrared information that is buffered can use a low-power information buffer and a high-power information buffer. The low-power buffer and the high-power buffer can be used for confirmation, filtering, and so on. In embodiments, the low-power infrared information buffer enables gunshot event confirmation. Gunshot event confirmation can discriminate a gunshot from other high dB level acoustic events such as thunder, fireworks, a vehicle backfiring, etc. In other embodiments, the high-power infrared information buffer enables spurious infrared information filtering. The spurious information filtering can filter out other infrared sources such as fire alarms, strobes, and the like.

The system 1600 can include an acoustic collecting component 1660. The collecting acoustic information can be based on motion detection. The collecting acoustic information can include collecting large amplitude acoustic information. The buffering component can include hardware or software for collecting acoustic information using the gunshot sensor device, where the collecting acoustic information is enabled by the motion detection. Based on collected mid-infrared information that enables motion detection, the acoustic collecting component can be turned on, enabled, engaged, etc., to collect the large amplitude acoustic information. In a usage example, motion detection based on collected mid-infrared information, including a possible muzzle flash, can enable an acoustic sensor to detect acoustic information in the 120 dB to 160 dB range. Embodiments include buffering the acoustic information. The buffering can include buffering the acoustic information in one or more buffers. In embodiments, the acoustic information that is buffered can use a low-power acoustic information buffer and a high-power acoustic information buffer. The low-power acoustic buffer and the high-power acoustic buffer can be used for detection, filtering, etc. In embodiments, the low-power acoustic information buffer can enable gunshot event detection. The gunshot event detection can be based on a dB value associated with the event, a range of dB values, and the like. The dB value or values can be in excess of dB values associated with human communication. In other embodiments, the high-power acoustic information buffer can enable spurious information filtering. The spurious information can be associated with fire alarms, natural acoustic sources such as thunder, etc.

The system 1600 can include a detecting component 1670. The detecting component can detect, using the gunshot sensor device, the high-intensity gunshot sound and can correlate that sound to the additional infrared information that was buffered and the acoustic information that was buffered. The detecting can be performed in hardware or software. In embodiments, the detecting can include monitoring the acoustic information to identify a high-intensity gunshot sound. In embodiments, the NIR band sensing provides gunshot muzzle flash detection. The detecting can be based on a comparison of the collected infrared and acoustic information to known signature data from firearm discharge. For example, a library of various signatures from firearms of different types can be stored within system 1600. As part of detecting, the detecting component 1670 can compare acquired information from the gunshot sensor device to data in the library to determine if the acquired information pertains to a gunshot, and possibly to indicate a firearm model and/or type that was used to create the gunshot. The detecting can include establishing a temporal correspondence between the gunshot sound and an infrared event that occurred in time before the gunshot sound. The infrared event can be detected in time before the gunshot sound, as light travels faster than sound. Further, the sound may reverberate off hard surfaces within the indoor environment causing multiple acoustic information detections due to multipath collection. Further embodiments include notifying the network of a possible gunshot occurrence, based on the detecting. The notifying the network can use information collected from other gunshot sensor devices to identify a location associated with the detected gunshot. The notifying can use the gunshot sensor device to notify the network of a possible gunshot occurrence. The notifying of the network can be based on cable-free techniques, where the cable-free communication to a network can include wireless communication. The network can include a wireless network such as a computer network based on Wi-Fi™, a local network based on Bluetooth™, Zigbee™, infrared, or other wireless techniques or standards. The network can include a wired network such as the Internet or other computer network, a hybrid network based on wireless and wired techniques, and so on. In embodiments, the notifying can be based on an analysis of a high-intensity gunshot sound and an NIR event that were detected. The analysis can be performed locally, remotely, and so on. In embodiments, the analysis can be performed by the gunshot sensor device. Further embodiments include periodic excursions to a higher-power mode by the gunshot sensor device, where the higher-power mode enables cable-free communication to a network of the sensor's health data to a gunshot detection gateway. By performing periodic excursions to a higher-power mode, battery life can be significantly extended. In other embodiments, the detecting a gunshot activates a video monitoring device. The video monitoring device can remain inactive, in a low-power mode, and the like, to maintain privacy of individuals occupying spaces at times other than during gunshot events. The video monitoring can provide a "live" video feed to security, law enforcement, emergency services, military, or other personnel who may be activated during a gunshot event.

The system 1600 can include a computer system for gunshot analysis comprising: a memory which stores instructions; one or more processors attached to the memory wherein the one or more processors, when executing the instructions which are stored, are configured to: collect infrared information using a gunshot sensor device, wherein the infrared information is collected using mid-infrared (MIR) band sensing to provide motion detection; buffer additional infrared information using the gunshot sensor device, wherein the additional infrared information is collected using near-infrared (NIR) band sensing, and wherein the buffering is enabled by the motion detection; collect acoustic information using the gunshot sensor device, wherein the collecting acoustic information is enabled by the motion detection; and detect a gunshot using the gunshot sensor device, wherein the detecting is based on the additional infrared information and the acoustic information.

The system 1600 can include a computer program product embodied in a non-transitory computer readable medium for gunshot analysis, the computer program product comprising code which causes one or more processors to perform operations of: collecting infrared information using a gunshot sensor device, wherein the infrared information is collected using mid-infrared (MIR) band sensing to provide motion detection; buffering additional infrared information using the gunshot sensor device, wherein the additional infrared information is collected using near-infrared (NIR) band sensing, and wherein the buffering is enabled by the motion detection; collecting acoustic information using the gunshot sensor device, wherein the collecting acoustic information is enabled by the motion detection; and detecting a gunshot using the gunshot sensor device, wherein the detecting is based on the additional infrared information and the acoustic information.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions-generally referred to herein as a "circuit," "module," or "system" may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Disclosed embodiments are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for gunshot analysis comprising:
    collecting infrared information using a gunshot sensor device, wherein the infrared information is used to provide motion detection;
    buffering additional infrared information using the gunshot sensor device, wherein the buffering is enabled by the motion detection;
    collecting acoustic information using the gunshot sensor device, wherein the collecting acoustic information is enabled by the motion detection; and
    detecting a gunshot using the gunshot sensor device, wherein the detecting is based on the additional infrared information and the acoustic information.

2. The method of claim 1 wherein the infrared information is collected using mid-infrared (MIR) band sensing.

3. The method of claim 1 wherein the additional infrared information is collected using near infrared (NIR) band sensing.

4. The method of claim 1 wherein the detecting includes monitoring the acoustic information to identify a high-intensity gunshot sound.

5. The method of claim 4 further comprising correlating the high-intensity gunshot sound to the infrared information that was buffered.

6. The method of claim 5 wherein the correlating includes establishing a temporal correspondence between the gunshot sound and an infrared event that occurred in time before the gunshot sound.

7. The method of claim 1 wherein the gunshot sensor device is deployed within an indoor environment.

8. The method of claim 1 wherein the gunshot sensor device uses cable-free communication to a network.

9. The method of claim 8 further comprising notifying the network of a possible gunshot occurrence, based on the detecting.

10. The method of claim 9 wherein the notifying is based on an analysis of a high-intensity gunshot sound and an infrared event that were detected.

11. The method of claim 1 wherein the gunshot sensor device is powered by a battery contained within the gunshot sensor device.

12. The method of claim 1 wherein the additional infrared information that is buffered uses a low-power infrared information buffer and a high-power infrared information buffer.

13. The method of claim 12 wherein the low-power infrared information buffer enables gunshot event confirmation.

14. The method of claim 13 wherein the high-power infrared information buffer enables spurious infrared information filtering.

15. The method of claim 14 wherein the spurious infrared information filtering includes high-level ambient lighting filtering.

16. The method of claim 1 wherein the collecting infrared information comprises an ultra-low-power mode of the gunshot sensor device.

17. The method of claim 16 further comprising periodic excursions to a higher-power mode by the gunshot sensor device, wherein the higher-power mode enables cable-free communication of gunshot sensor health data to a gunshot detection gateway.

18. The method of claim 17 wherein the gunshot sensor health data includes one or more of gunshot sensor device identification (ID), battery levels, battery drain rate, self-diagnostic data, local communication data, or additional event data.

19. The method of claim 1 further comprising buffering the acoustic information.

20. The method of claim 19 wherein the acoustic information that is buffered uses a low-power acoustic information buffer and a high-power acoustic information buffer.

21. The method of claim 20 wherein the low-power acoustic information buffer enables gunshot event detection.

22. The method of claim 21 wherein the high-power acoustic information buffer enables spurious information filtering.

23. The method of claim 1 wherein the detecting a gunshot activates a video monitoring device.

24. The method of claim 1 wherein the infrared sensing provides gunshot muzzle flash detection.

25. An apparatus for gunshot analysis comprising:
- an infrared sensor located in a housing, wherein the infrared sensor provides motion detection;
- an acoustic sensor co-located in the housing, wherein the acoustic sensor collects high-intensity sounds and enables acoustic monitoring; and
- a battery, wherein the battery is connected to provide power to the sensors, and wherein the battery is contained within, on, or next to the housing.

26. The apparatus of claim 25 further comprising a mid-infrared (MIR) band sensor located in the housing, wherein the mid-infrared band sensor provides motion detection.

27. The apparatus of claim 25 further comprising a processor contained in the housing, wherein the processor is coupled to the acoustic sensor and the infrared sensor, and wherein the processor is connected to the battery.

28. The apparatus of claim 27 further comprising a cable-free communication device contained within the housing, wherein the cable-free communication device is coupled to the processor and is connected to the battery to provide gunshot analysis to a network.

29. A computer system for gunshot analysis comprising:
- a memory which stores instructions;
- one or more processors coupled to the memory wherein the one or more processors, when executing the instructions which are stored, are configured to:
  - collect infrared information using a gunshot sensor device, wherein the infrared information is used to provide motion detection;
  - buffer additional infrared information using the gunshot sensor device, wherein the buffering is enabled by the motion detection;
  - collect acoustic information using the gunshot sensor device, wherein the collecting acoustic information is enabled by the motion detection; and
  - detect a gunshot using the gunshot sensor device, wherein the detecting is based on the additional infrared information and the acoustic information.

\* \* \* \* \*